United States Patent
Ryoo et al.

(10) Patent No.: US 10,631,287 B2
(45) Date of Patent: Apr. 21, 2020

(54) METHOD AND APPARATUS FOR SUPPORTING MULTI-RADIO ACCESS TECHNOLOGY

(71) Applicant: Samsung Electronics Co., Ltd., Suwon-si, Gyeonggi-do (KR)

(72) Inventors: Sunheui Ryoo, Yongin-si (KR); Beomsik Bae, Suwon-si (KR); Daegyun Kim, Seongnam-si (KR); Wonil Roh, Yongin-si (KR); Kyunghoon Cheun, Seoul (KR); Jungsoo Jung, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 170 days.

(21) Appl. No.: 14/861,138

(22) Filed: Sep. 22, 2015

(65) Prior Publication Data

US 2016/0095108 A1     Mar. 31, 2016

Related U.S. Application Data

(60) Provisional application No. 62/055,888, filed on Sep. 26, 2014.

(30) Foreign Application Priority Data

Feb. 10, 2015     (KR) ........................ 10-2015-0019911

(51) Int. Cl.
*H04W 72/04*     (2009.01)
*H04W 76/15*     (2018.01)
(Continued)

(52) U.S. Cl.
CPC ....... *H04W 72/0426* (2013.01); *H04L 5/0007* (2013.01); *H04L 5/0032* (2013.01); *H04W 76/15* (2018.02); *H04W 84/045* (2013.01)

(58) Field of Classification Search
CPC ... H04L 5/0007; H04L 5/0032; H04L 5/0035; H04W 76/025; H04W 72/0426;
(Continued)

(56) References Cited

U.S. PATENT DOCUMENTS 8,817,623 B2     8/2014 Gupta et al.
2009/0270107 A1  10/2009 Lee et al.
(Continued)

FOREIGN PATENT DOCUMENTS

CN     103458398 A     12/2013
CN     103782651 A      5/2014
(Continued)

OTHER PUBLICATIONS

Himayat et al. (U.S. Appl. No. 62/007,388—[RAN2] System Operation and Enchanced Radio Resource Control (RRC) Protocol for Integrated WLAN/3GPP Radio Access Technologies [provisional of US 2015/0350988 A1]), Jun. 3, 2014, whole document (Year: 2014).*

(Continued)

*Primary Examiner* — Un C Cho
*Assistant Examiner* — Jose L Perez
(74) *Attorney, Agent, or Firm* — Jefferson IP Law, LLP

(57) ABSTRACT

The present disclosure relates to a pre-$5^{th}$-Generation (5G) or 5G communication system to be provided for supporting higher data rates beyond $4^{th}$-Generation (4G) communication system such as Long Term Evolution (LTE). A communication method and an apparatus for efficiently supporting a multi-radio access network (multi-RAN) within a wireless communication system are provided. The communication method of a second base station in a network using first wireless communication and second wireless communication includes receiving first information from a first base station via a first wireless communication link, receiving (Continued)

second information in a communication link which differs from the first wireless communication link, identifying control information to be transmitted via a second wireless communication link based on the first information, and identifying data to be transmitted via the second wireless communication link based on the second information, and transmitting the control information and the data via the second wireless communication.

20 Claims, 18 Drawing Sheets

(51) Int. Cl.
*H04L 5/00* (2006.01)
*H04W 84/04* (2009.01)

(58) Field of Classification Search
CPC ......... H04W 84/045; H04W 72/0406; H04W 72/0433; H04W 76/15
See application file for complete search history.

(56) References Cited

U.S. PATENT DOCUMENTS

| | | | | |
|---|---|---|---|---|
| 2010/0238903 | A1* | 9/2010 | Kitazoe | H04W 36/0038 370/332 |
| 2012/0069789 | A1* | 3/2012 | Hapsari | H04W 36/0016 370/315 |
| 2012/0184204 | A1* | 7/2012 | Kazmi | H04B 7/15542 455/7 |
| 2013/0242935 | A1* | 9/2013 | Lim | H04B 7/022 370/329 |
| 2014/0018083 | A1* | 1/2014 | Laraqui | H04W 84/042 455/446 |
| 2014/0135006 | A1* | 5/2014 | Yu | H04W 36/0055 455/436 |
| 2014/0198734 | A1* | 7/2014 | Yamada | H04W 76/00 370/329 |
| 2014/0321282 | A1* | 10/2014 | Pragada | H04W 28/10 370/235 |
| 2014/0355562 | A1* | 12/2014 | Gao | H04B 7/02 370/331 |
| 2015/0004918 | A1* | 1/2015 | Wang | H04W 88/02 455/73 |
| 2015/0109943 | A1* | 4/2015 | Sahin | H04W 16/28 370/252 |
| 2015/0124748 | A1* | 5/2015 | Park | H04L 5/0032 370/329 |
| 2015/0215840 | A1* | 7/2015 | Yiu | H04W 40/02 370/329 |
| 2015/0230209 | A1* | 8/2015 | Jactat | H04W 88/04 370/315 |
| 2015/0264615 | A1* | 9/2015 | Zhao | H04W 72/0406 370/329 |
| 2015/0312797 | A1 | 10/2015 | Cui et al. | |
| 2015/0334766 | A1* | 11/2015 | Lee | H04W 48/12 455/426.1 |
| 2016/0007371 | A1* | 1/2016 | Pietraski | H04W 72/1263 370/315 |
| 2016/0112945 | A1 | 4/2016 | Chen et al. | |
| 2016/0219475 | A1* | 7/2016 | Kim | H04L 5/00 |
| 2017/0034812 | A1* | 2/2017 | Deng | H04W 72/046 |
| 2019/0274183 | A1* | 9/2019 | Pelletier | H04W 52/365 |

FOREIGN PATENT DOCUMENTS

| | | | |
|---|---|---|---|
| CN | 104010370 A | 8/2014 | |
| GB | 2500896 A * | 10/2013 | ......... H04W 72/042 |
| KR | 10-1400882 B1 | 6/2014 | |
| WO | 2013/040749 A1 | 3/2013 | |
| WO | 2013/086164 A1 | 6/2013 | |
| WO | 2013/086410 A2 | 6/2013 | |
| WO | 2013/089733 A1 | 6/2013 | |
| WO | WO 2013086410 A2 * | 6/2013 | ........ H04W 36/0072 |
| WO | WO-2013086410 A2 * | 6/2013 | ........ H04W 36/0072 |
| WO | 2013/185683 A2 | 12/2013 | |
| WO | 2014/082270 A1 | 6/2014 | |

OTHER PUBLICATIONS

Intel Corporation; Evaluation of uplink CoMP with non-ideal backhaul link; 3GPP TSG-RAN WG1 #74bis; R1-134143; Oct. 7-10, 2013; Guangzhou, China.
3GPP; The Mobile Broadband Standard; 3GPP Specification detail; 3GPP TR 36.874 V12.0.0; Dec. 20, 2013; France.
Ericsson; Evaluation of non ideal backhaul scenarios in Inter eNB CoMP for LTE; 3GPP TSG-RAN WG3 Meeting #83; R3-140327; Feb. 10-14, 2014; Prague, CZ.
European Search Report dated Oct. 4, 2017, issued in the European Application No. 15844088.3.
Chinese Office Action dated Aug. 19, 2019, issued in a counterpart Chinese application No. 201580052413.7.

* cited by examiner

METHOD AND APPARATUS FOR SUPPORTING MULTI-RADIO ACCESS TECHNOLOGY

CROSS-REFERENCE TO RELATED APPLICATION(S)

This application claims the benefit under 35 U.S.C. § 119(e) of a U.S. Provisional application filed on Sep. 26, 2014 in the U.S. Patent and Trademark Office and assigned Ser. No. 62/055,888, and under 35 U.S.C. § 119(a) of a Korean patent application filed on Feb. 10, 2015 in the Korean Intellectual Property Office and assigned Ser. No. 10-2015-0019911, the entire disclosure of each of which is hereby incorporated by reference.

TECHNICAL FIELD

The present disclosure relates to a method and apparatus for supporting a multi-radio access technology (multi-RAT). More particularly, the present disclosure relates to a method and apparatus for efficiently supporting a multi-radio access network (multi-RAN) within a wireless communication system.

BACKGROUND

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

FIG. 1 is a diagram showing a heterogeneous network according to the related art. An existing multi-radio access technology (multi-RAT) merging management method is an accessing method of selecting between heterogeneous networks, and performing transmission between a user equipment (UE) and an evolved node B (eNB) via a cellular macro communication network 110 and one of the millimeter wave (mmW) communication networks 130.

Referring to FIG. 1, a macro communication network 110 and a plurality of mmW communication networks 130 form a multi-RAT network. The macro communication network 110 may be various cellular communication networks including a long term evolution (LTE) communication network. The mmW communication network 130 may employ an mmW of 60 GHz and also use access points (APs). The macro communication network 110 and the mmW communication networks 130 may communicate using a control plane and a user plane. The mmW communication networks may be connected to each other with Xw interfaces. There are technologies of the related art, within one of which, for example, a client device uses communication capability information, i.e., available RAT information and stop/movement information, and data rate request, and determines a transmission link from among the cellular/Wi-Fi or mmW link, according to corresponding information.

FIG. 2 is a diagram showing a dual connectivity network according to the related art.

In a system of remote radio head (RRH) in a cellular communication system, a mobile device 250 can receive access via a small cell 240 or macro cell 230 such as an evolved node B (eNB). The macro cell 230 is connected to a mobility management entity (MME) 220 to receive network access from gateway/home subscriber server (GW/HSS) 210 via a core network. The small cell 240 also receive network access from the GW/HSS 210. It is assumed that the capacity of the Xw interface as an inter-eNB connection is sufficiently large and transmission is very small (less than 10 ms), assuming an ideal backhaul. Existing studies performed in $3^{rd}$ Generation Partnership Project (3GPP) Release 12, e.g., small cell enhancement, dual connectivity, etc., have discussed a number of design options, such as a method of connecting data plane (or user plane) and control plane to a small cell 240 via a macro cell 230 as shown in FIG. 2, directly transmitting data from a core network via a to a small cell 240, etc. However, technologies of the related art have not resolved a control signaling delay that is caused when inter-eNB transmission path is a non-ideal backhaul.

Since the architecture of the small cell employing the mmW frequency band has a difference between the assumptions of the related art (e.g., an assumption of a non-ideal backhaul) and the real situation, there is a need to improve design to reduce the control channel delay and to enhance the data channel capacity.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for efficiently supporting a multi-radio access technology (multi-RAT).

Another aspect of the present disclosure is to provide a method and apparatus that, in a network within which a cellular macro communication network and a small cell communication network, including millimeter wave (mmW) mobile communication are co-existing, resolves a control delay between multi-RAT evolved node B (eNB) and small cell eNB, based on a transmission delay between the multi-RAT eNB and small cell eNB.

In accordance with an aspect of the present disclosure, a communication method of a second base station in a network using first wireless communication and second wireless communication is provided. The communication method includes receiving first information from a first base station via a first wireless communication link, receiving second information in a communication link which differs from the first wireless communication link, identifying control information to be transmitted via a second wireless communication link based on the first information, and identifying data to be transmitted via the second wireless communication link based on the second information, and transmitting the control information and the data via the second wireless communication.

In accordance with another aspect of the present disclosure, a second base station of a network using first wireless communication and second wireless communication is provided. The second base station includes a first radio communication unit, a second radio communication unit, and a controller configured to receive first information from a first base station via first wireless communication link, receive second information in a communication link which differs from the first wireless communication link, identify control information to be transmitted via a second wireless communication link based on the first information, and data to be transmitted via second wireless communication link based on the second information, and transmit the control information and the data via the second wireless communication link.

In accordance with another aspect of the present disclosure, a communication method of a first base station in a network using first wireless communication and second wireless communication is provided. The communication method includes receiving first information, identifying whether the first information is control information to be transmitted from a second base station and transmitting, when the first information is the control information, the first information to the second base station via the first wireless communication link, wherein the first information corresponds to second information, and the second information is received by the second base station via a communication link which differs from the first wireless communication link.

In accordance with another aspect of the present disclosure, a first base station of a network using first wireless communication and second wireless communication is provided. The first base station includes a communication unit and a controller configured to receive first information, identify whether the first information is control information to be transmitted from a second base station, and transmit, when the first information is the control information, the first information to the second base station via the first wireless communication link, wherein the first information corresponds to second information, and wherein the second information is received by the second base station via a communication link which differs from the first wireless communication link.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
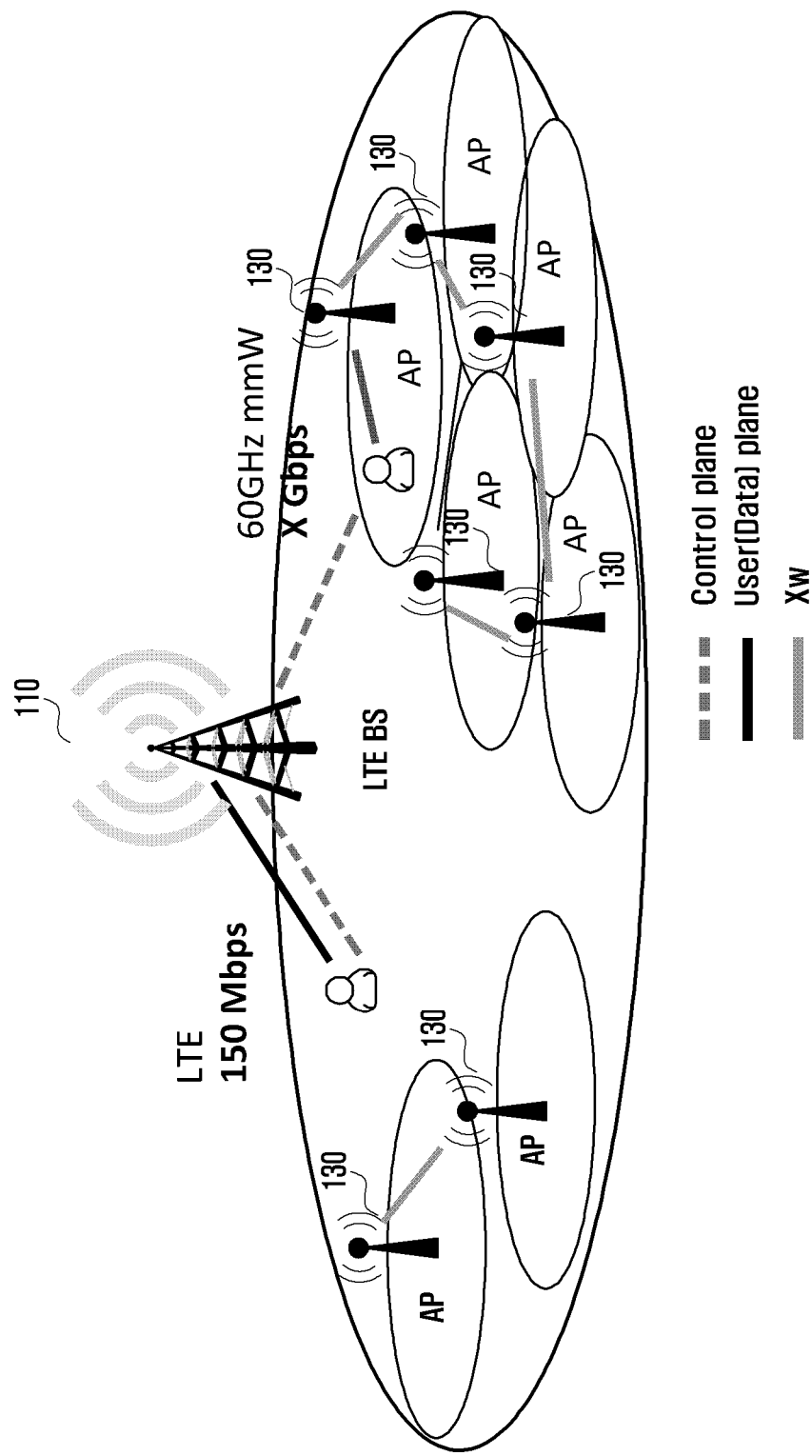
FIG. 1 is a diagram of a heterogeneous network according to the related art.
Figure 2:
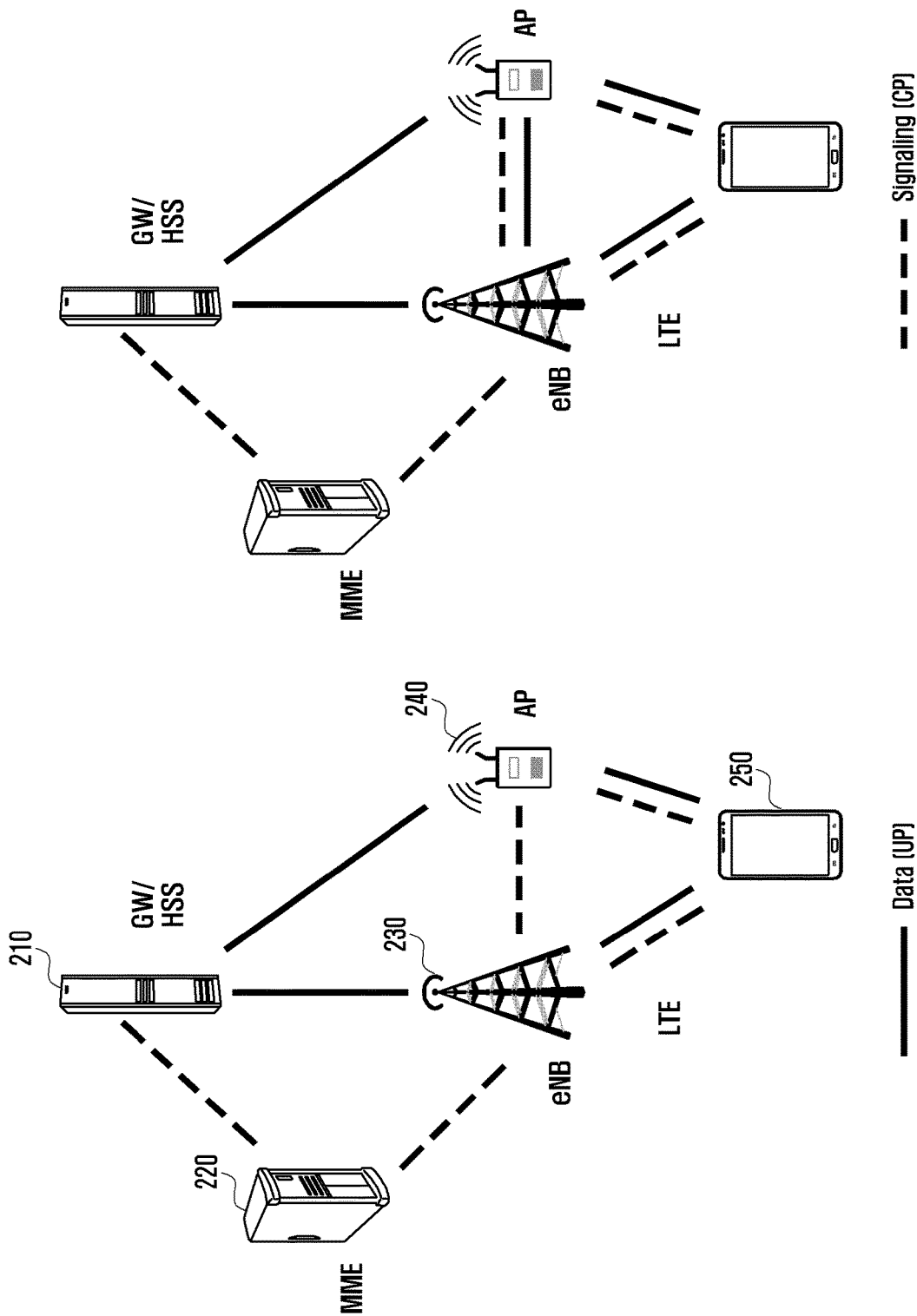
FIG. 2 is a diagram of a dual connectivity network according to the related art.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description, a method and apparatus for supporting multi-radio access technology (multi-RAT) is explained. The various embodiments of the present disclosure may provide network design, uplink (UL) management, inter-evolved node B (eNB) synchronization, etc. to resolve transmission delay of control signals in a multi-RAT network.

In the various embodiments of the present disclosure, the terms, millimeter wave (mmW) access point (AP) and mmW AP eNB, and unlicensed band small cell and unlicensed band small cell eNB may be used in a similar manner, respectively, and may be used interchangeably.

When a multi-RAT network is managed by using a macro cell of a licensed band and a small cell of an unlicensed band (e.g., communication in the 60 GHz spectrum), issues may occur due to the characteristics of the cells. The cellular macro cell has a wide coverage with a licensed band, however the bandwidth may be relatively narrow and the data rate may also be relatively small. The small cell of an unlicensed band has a small coverage in a higher frequency band, however, the bandwidth may be relatively wide and the data rate may also be relatively large. When multi-RAT eNBs are connected to each other via a non-dedicated line, the delay time may be long. When multi-RAT eNBs are connected to each other with a dedicated line, it is disadvantageous in that, as the number of small cells increases, costs may increase. Meanwhile, the user plane of a large capacity system needs to support a high data rate, and the control plane of a small capacity system needs to support high speed transmission of control channel rather than a high data rate. Therefore, various embodiments of the present disclosure provide a method and apparatus for optimally forming a multi-RAT network.

The present disclosure describes a method and apparatus for efficiently managing a multi-RAT network between a macro cell using a cellular network of a licensed band and a small cell using an unlicensed band. In the present disclosure, the macro cell using a cellular network is described based on, for example, a long term evolution (LTE) network, and the small cell using an unlicensed band is described based on, for example, a network in the 60 GHz spectrum.

In addition, the present disclosure describes a communication method of an mmW AP when a bearer for control signals and a data bearer are separated in an mmW AR Although the present disclosure does not describe in detail a method how a macro cell eNB or an eNB of a cellular network simultaneously transmits signals to the mmW AP and a user equipment (UE), a macro cell eNB and a UE can communicate with each other in various methods, such as carrier aggregation, dual connectivity, etc.

Figure 3:
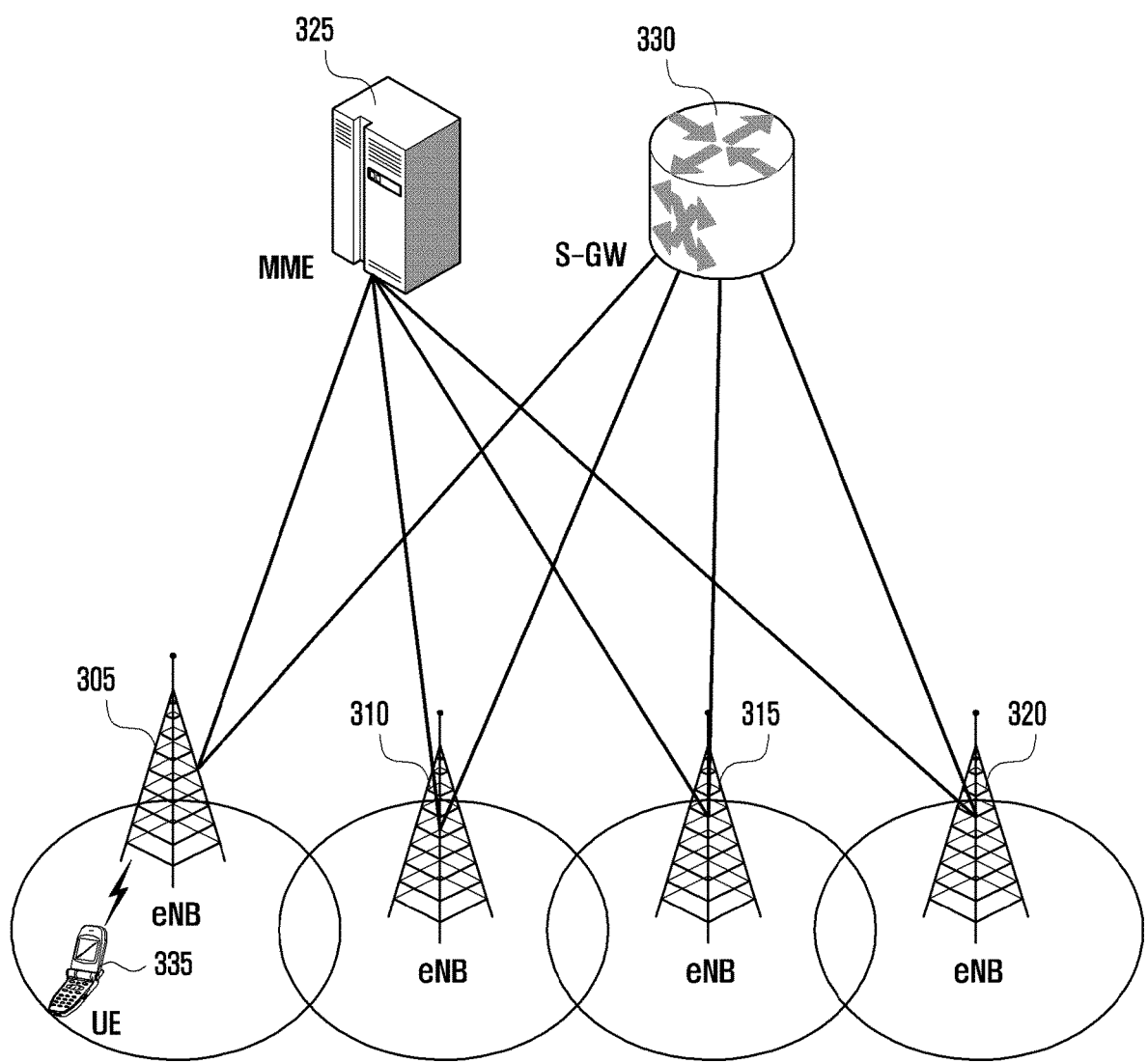
FIG. 3 is a diagram of a long term evolution (LTE) system according to an embodiment of the present disclosure.

FIG. 3 is a diagram of an LTE system according to an embodiment of the present disclosure.

Referring to FIG. 3, the LTE system configures the radio access network, including eNBs 305, 310, 315, and 320, a mobility management entity (MME) 325, and a serving-gateway (S-GW) 330. A UE 335 is connected to an external network via any of the eNBs 305, 310, 315, and 320 and S-GW 330.

The eNBs 305, 310, 315, and 320 correspond to Node Bs (i.e., base station) of the UMTS system according to the related art. The eNBs 305, 310, 315, and 320 are connected to the UE 335 via wireless channels, performing more complicated functions than Node B of the related art. In an LTE system, since real-time voice over Internet protocol (VoIP) services and all user traffic are served via shared channels, apparatuses (devices) are required to collect information regarding states, such as buffer states of UE devices, available transmission power states, channel states, etc., and to schedule and coordinate network operations. The scheduling is performed by eNBs 305, 310, 315, and 320. One eNB controls a plurality of cells. For example, to implement a transmission rate of 100 megabits per second (Mbps), LTE systems employ orthogonal frequency division multiplexing (OFDM), as a RAT, at a bandwidth of 20 MHz. LTE systems also employ adaptive modulation & coding (AMC) to determine a modulation scheme and channel coding rate, according to the channel state of UE.

The S-GW 330 creates or removes data bearers according to the control of MME 325. The MME 325 manages the mobility of a UE and controls a variety of functions. The MME 325 connects to a plurality of eNBs.

Figure 4:
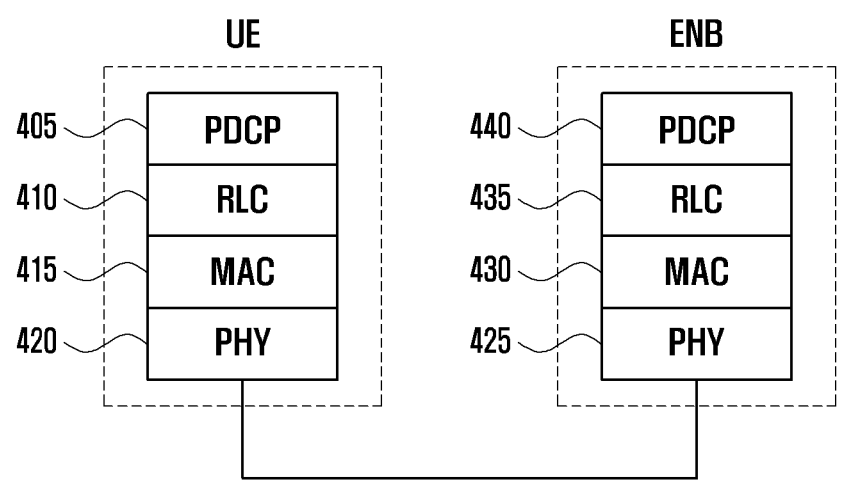
FIG. 4 is a diagram of a radio protocol stack of an LTE system according to an embodiment of the present disclosure.

FIG. 4 is a diagram of a radio protocol stack of an LTE system according to an embodiment of the present disclosure.

Referring to FIG. 4, in the radio protocol of an LTE system, a UE and an eNB have packet data convergence protocol (PDCP) layers 405 and 440, radio link control (RLC) layers 410 and 435, and medium access control (MAC) layers 415 and 430, respectively. PDCP layers 405 and 440 perform compression and/or decompression of IP headers. RLC layers 410 and 435 reconfigure a PDCP packet data unit (PDU) in proper size. MAC layers 415 and 430 connect to a number of RLC layer devices configured in one UE device. MAC layers 415 and 430 multiplex RLC PDUs into a MAC PDU and de-multiplexes RLC PDUs from a MAC PDU. Physical layers (PHY) 420 and 425 channel-code and modulate data from the upper layers (e.g. MAC layers 415 and 430), create OFDM symbols, and transmit the OFDM symbols via a radio channel. In addition, PHY layers 420 and 425 demodulate and decode OFDM symbols transmitted via a radio channel, and transfer the decoded data to the upper layers (e.g., MAC layers 415 and 430). In order to correct additional errors, PHY layers 420 and 425 also use hybrid automatic repeat request (HARQ), and the reception node transmits a check bit indicating whether it has received packets from a transmission node, which is called HARQ acknowledgement (ACK)/negative acknowledgement (NACK). Downlink (DL) HARQ ACK/NACK for UL transmission may be transmitted via physical HARQ indicator channel. UL HARQ ACK/NACK for DL transmission may be transmitted via physical uplink control channel (PUCC) or physical uplink shared channel (PUSCH).

In the following description, various embodiments of the present disclosure are described by referring to the accompanying drawings. Various embodiments of the present disclosure provide a method of reducing control channel delay and efficiently managing network connections (e.g., Xw interfaces) between eNBs in a multi-RAT network and between a macro eNB (MeNB) of a cellular network and a small cell eNB (e.g., an mmW eNB). To this end, various embodiments of the present disclosure may separate a bearer for a control plane (i.e., a control plane bearer) from a bearer for a user plane (i.e., a user plane bearer). In addition, control channels may be transmitted by using LTE wireless connections. In this case, the mmW AP may operate in a similar way as a UE in an LTE systems. Therefore, the mmW AP can transmit/receive control channel information to/from the LTE macro cell via wireless communication.

Various embodiments of the present disclosure provide a method of separating an eNB backhaul from an unlicensed band small cell and managing the backhaul, a method of setting up a new interface between a MeNB and an mmW AP, architecture of a new protocol stack (Xs) included in an unlicensed band AP, a method of creating a dedicated logical bearer for an LTE user equipment (LTE-UE included in an unlicensed band AP, a method of indicating a UE mode by a small cell eNB, a scheduling method of a multi-RAT system, and a method of differentiating the configuration of the LTE-UE in an mmW AP by using a radio resource control (RRC) message.

Figure 5:
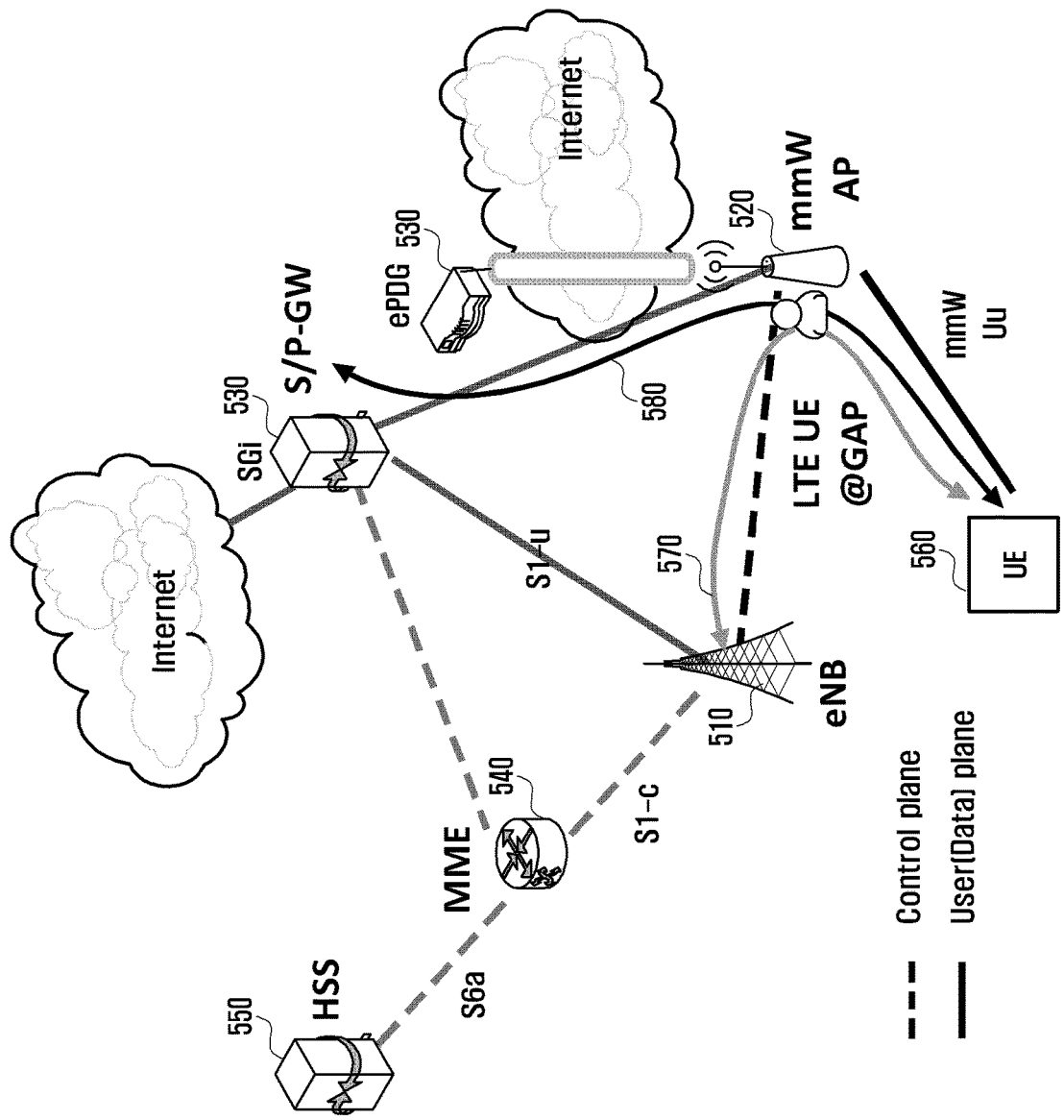
FIG. 5 is a diagram of a backhaul separation in an unlicensed band according to an embodiment of the present disclosure.

FIG. 5 is a diagram of a backhaul separation in an unlicensed band according to an embodiment of the present disclosure.

Referring to FIG. 5, a multi-RAT network may include an eNB 510, an mmW AP 520, a S-GW/packet data network gateway (P-GW) (S/P-GW) 530, an enhanced P-GW (ePDG) 535, an MME 540, and a home subscriber server (HSS) 550. The multi-RAT network may communicate with at least one UE device 560.

The respective entities may perform transmission/reception of signals to each other. In particular, in FIG. 5, dashed lines represent a control plane and the solid lines represent a user plane or data plane. The control plane may refer to a path transferring control signals. The user plane may refer to a path transferring data signals. The bidirectional arrow passing via the eNB 510 and mmW AP 520 is a backhaul 570 transferring control signals. The bidirectional arrow passing via the upper gateway 530 or 535 and the mmW AP 520 is a backhaul 580 transferring data signals.

As shown in FIG. 5, the mmW AP 520 may separate a backhaul 570 transmitting control signals from a backhaul 580 transmitting data. That is, the backhaul separation includes communicating control information between the cellular eNB (e.g., LTE eNB 510) and the small eNB (e.g., mmW AP 520) by using a mobile communication technology that the eNB 510 provides to a UE. The backhaul separation also includes transmitting data of a UE to which the mmW AP 520 provides services, via the Internet connected to the mmW AP 520 or the Internet or a service provider's core network using a transmission technology which differs from the mobile communication technology provided by the eNB 510.

The user plane may be transmitted to the mmW AP 520 via a dedicated line. The mmW AP 520 may perform transmission of data for a UE to which the mmW AP 520 provides services. The interface between the mmW AP 520 and the UE 560 may be referred to as the mmW Uu interface. The control plane may be transmitted to the mmW AP 520 via the eNB 510 via a backhaul which differs from the user plane. The control plane to the mmW AP 520 via the eNB 510 may be transmitted by mobile communication provided by the eNB 510. For example, the control plane may be transmitted to the mmW AP 520 by using LTE communication of the eNB 510. The interface transmitting the control plane between the eNB 510 and the mmW AP 520 may be defined as the Xs interface or Xw_Uu interface.

As described above, the multi-RAT network is separated into a backhaul for control plane and a backhaul for user plane so that control signals and data may be transmitted via the backhauls respectively. Since control signals for a control plane may be transmitted from the eNB 510 to the mmW AP 520 via a cellular network, transmission delay can be resolved. For a user plane, the data rate can be increased by using a backhaul for data that is different from a control-related backhaul.

The present disclosure may be applied when a backhaul separated for user plane data is transmitted over a core network and when transmission is performed from a backhaul via an eNB.

In order to transmit a control plane between the eNB 510 and the mmW AP 520 using LTE, an interface between the eNB 510 and the mmW AP 520 is implemented. The interface may be implemented by a logical bearer with the eNB 510 serving as a relay (a method of creating an IP-based LTE link between eNBs and using the link as a control channel between the eNB and the mmW AP).

Figure 6:
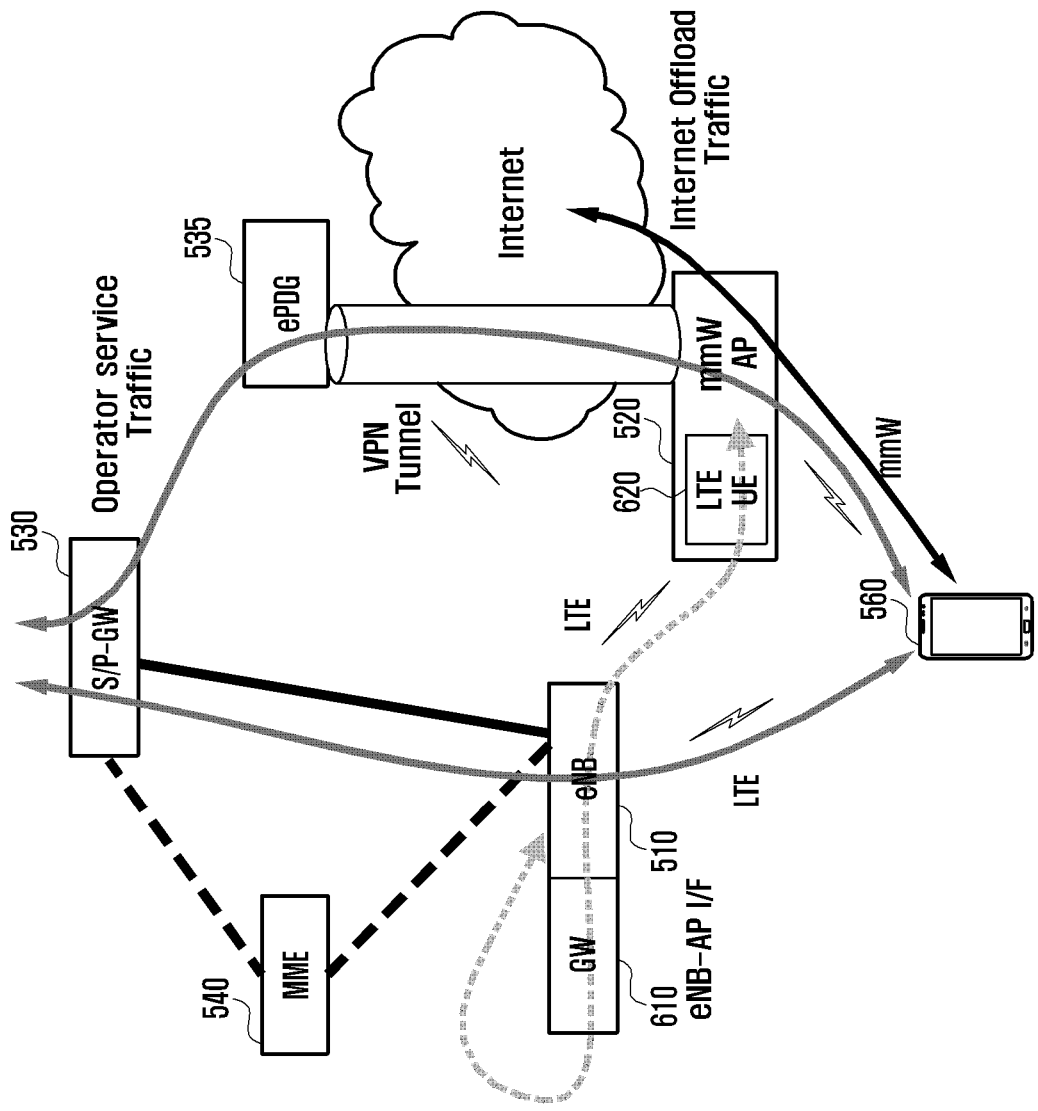
FIG. 6 is a diagram of transmitting a control channel between a macro evolved node B (eNB) and a millimeter wave (mmW) access point (AP) via an Internet protocol (IP)-based LTE link according to an embodiment of the present disclosure.

FIG. 6 is a diagram of transmitting a control channel between an eNB and an mmW AP via an IP-based LTE link according to an embodiment of the present disclosure.

Referring to FIG. 6, the eNB 510 may further include a GW 610 for supporting IP-communication with the mmW AP 520. The mmW AP 520 may further include a communication module 620 (e.g., an LTE-UE module 620) for supporting IP-communication with the eNB 510. The mmW AP 520 may further include a universal subscriber identity module (USIM) for the LTE-UE module 620. The eNB 510 and the mmW AP 520 may be connected to each other via an LTE user plane. The eNB 510 and the mmW AP 520 may communicate with each other by using IP packets. The control signals for the mmW AP 520 may be transmitted between the eNB 510 and the mmW AP 520 via a user plane.

An LTE connection (Xw) between small cell eNBs, connection between an MeNB and an mmW eNB, and transmission between multi-RAT eNBs is advantageous because it allows a service provider to install and manage a corresponding network. The system illustrated in FIG. 6 requires a USIM that implements a separate LTE-UE function per small cell mmW AP 520 and transmits control information between eNBs. The macro cell eNB 510 and the small cell mmW AP 520 may be connected to each other via a cellular network LTE user plane. Therefore, IP packets transmitted from the LTE-UE module 620 in the mmW AP 520 may be transmitted to the macro cell eNB 510 via the GW 610.

Figure 7:
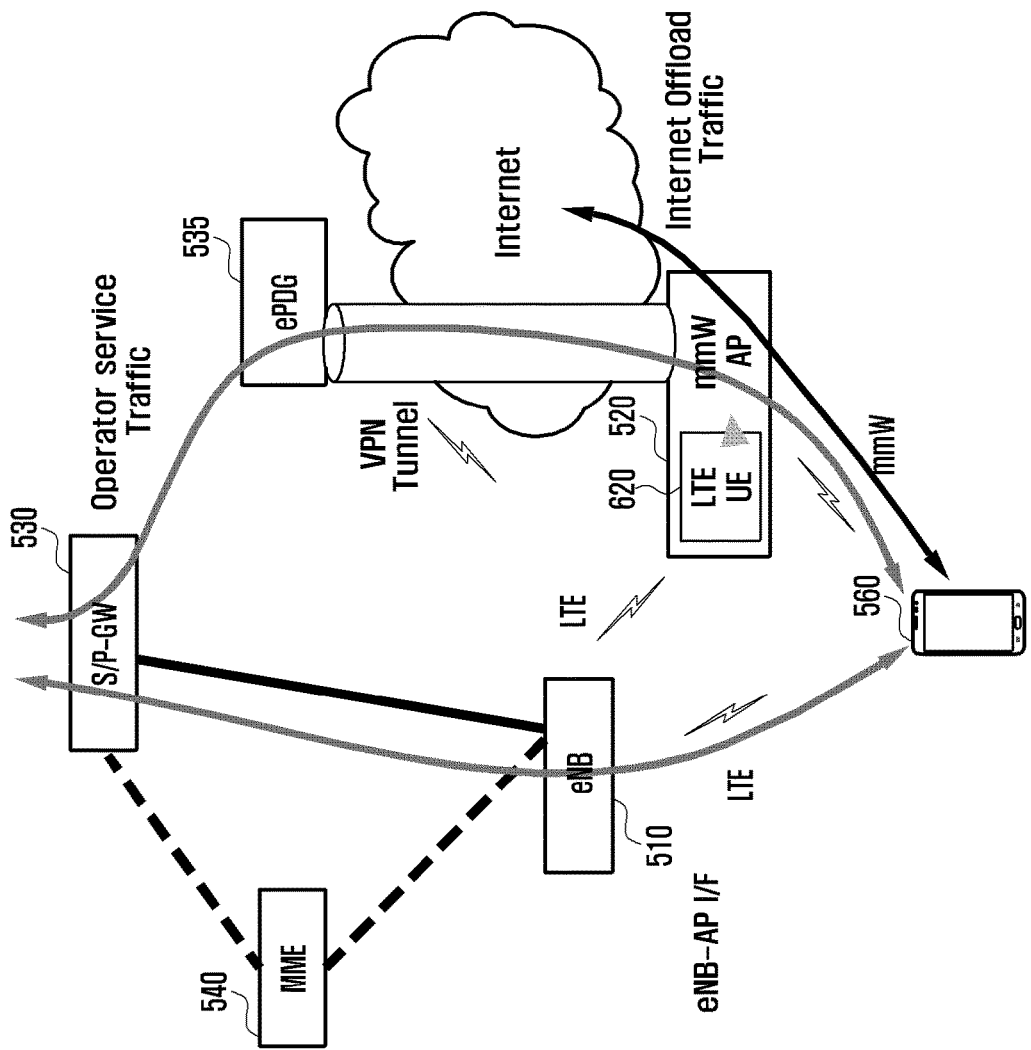
FIG. 7 is a diagram of a connectivity setup establishing a logical bearer between a macro eNB and an mmW AP according to an embodiment of the present disclosure.

FIG. 7 is a of a connectivity setup method of establishing a logical bearer between a MeNB and an mmW AP according to an embodiment of the present disclosure.

Referring to FIG. 7, the network is similar in structure to that of FIG. 6, except for the gateway 610 of the eNB 510.

The eNB 510 and the mmW AP 520 may create a separate logical bearer to transmit control signals. Since a separate logical bearer is created, the entities do not need IP communication. Since pre-defined authentication and security methods are used, the mmW AP 520 does not need a separate USIM. The embodiment illustrated in FIG. 7 may reduce the overhead as compared with that of FIG. 6.

That is, a separate LTE logical bearer is created for connection (Xw) between the cellular MeNB 510 and a small cell eNB including the mmW eNB 520 and for transmission between multi-RAT eNBs. Control signals may be transmitted via the separate LTE logical bearer. Since connection between the cellular MeNB 510 and the small cell eNB including the mmW eNB 520 is a network managed by a service provider managing both of the eNBs, the connection may be managed by using pre-defined authentication and security.

Figure 8:
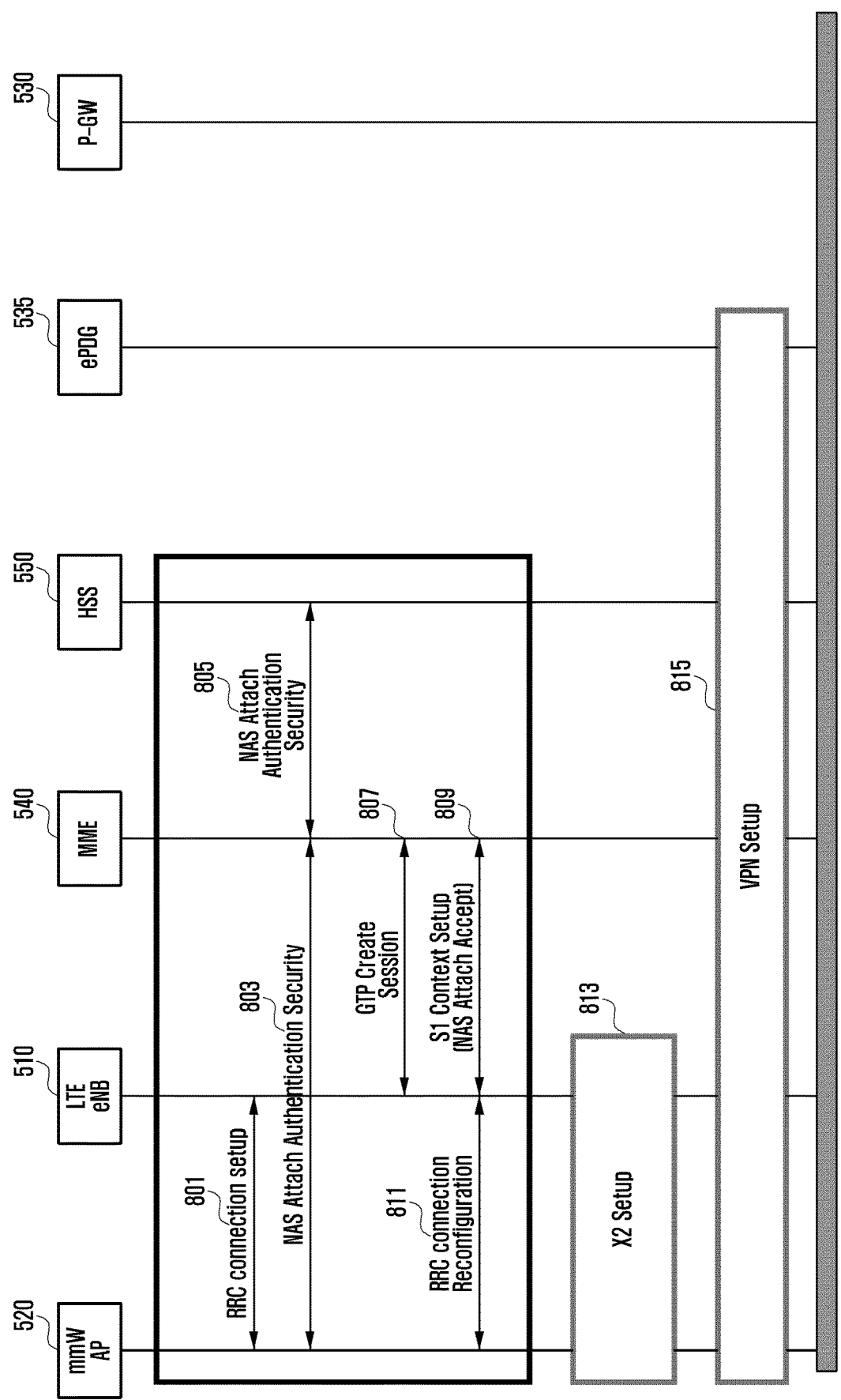
FIG. 8 is a flow diagram of a method of setting up connectivity between a cellular eNB and an mmW AP according to various embodiments of the present disclosure.

FIG. 8 is a flow diagram of a method of setting up connectivity between a cellular eNB and an mmW AP according to various embodiments of the present disclosure.

Referring to FIG. 8, the mmW AP 520 may communicate with various entities via the LTE-UE module 620. In particular, the mmW AP 520 and the LTE eNB 510 may perform a process of RRC connection setup in operation 801. A non-access stratum (NAS) attach authentication and security may be performed between the mmW AP 520 and the MME 540 in operation 803. Integrity-checking and ciphering may be performed for the NAS signaling messages between the mmW AP 520 and the MME 540. The ciphering process may be optionally performed. The NAS security process may be performed by making an authentication between the subscriber and the network. The MME 540 and the HSS 550 may perform the NAS attach authentication and security in operation 805. The HSS 550 may obtain an authentication vector and transmit the authentication vector to the MME 540. The MME 540 may authenticate the mmW AP 520 by using the authentication vector.

The LTE eNB 510 and the MME 540 may use a general packet radio service (GPRS) tunneling protocol (GTP) to create a session in operation 807. An 51 context setup may be performed between the MME 540 and the LTE eNB 510 in operation 809. RRC connection reconfiguration may be performed between the LTE eNB 510 and the mmW AP 520 in operation 811. An X2 setup may be performed between the mmW AP 520 and the LTE eNB 510 in operation 813. A virtual private network (VPN) may be set up between the mmW AP 520 and the ePDG 535 in operation 815.

Meanwhile, a protocol stack may be defined to support a dedicated logical bearer between a macro cell eNB and the mmW AP. In addition, a new dedicated logical bearer may be set up.

Figure 9:
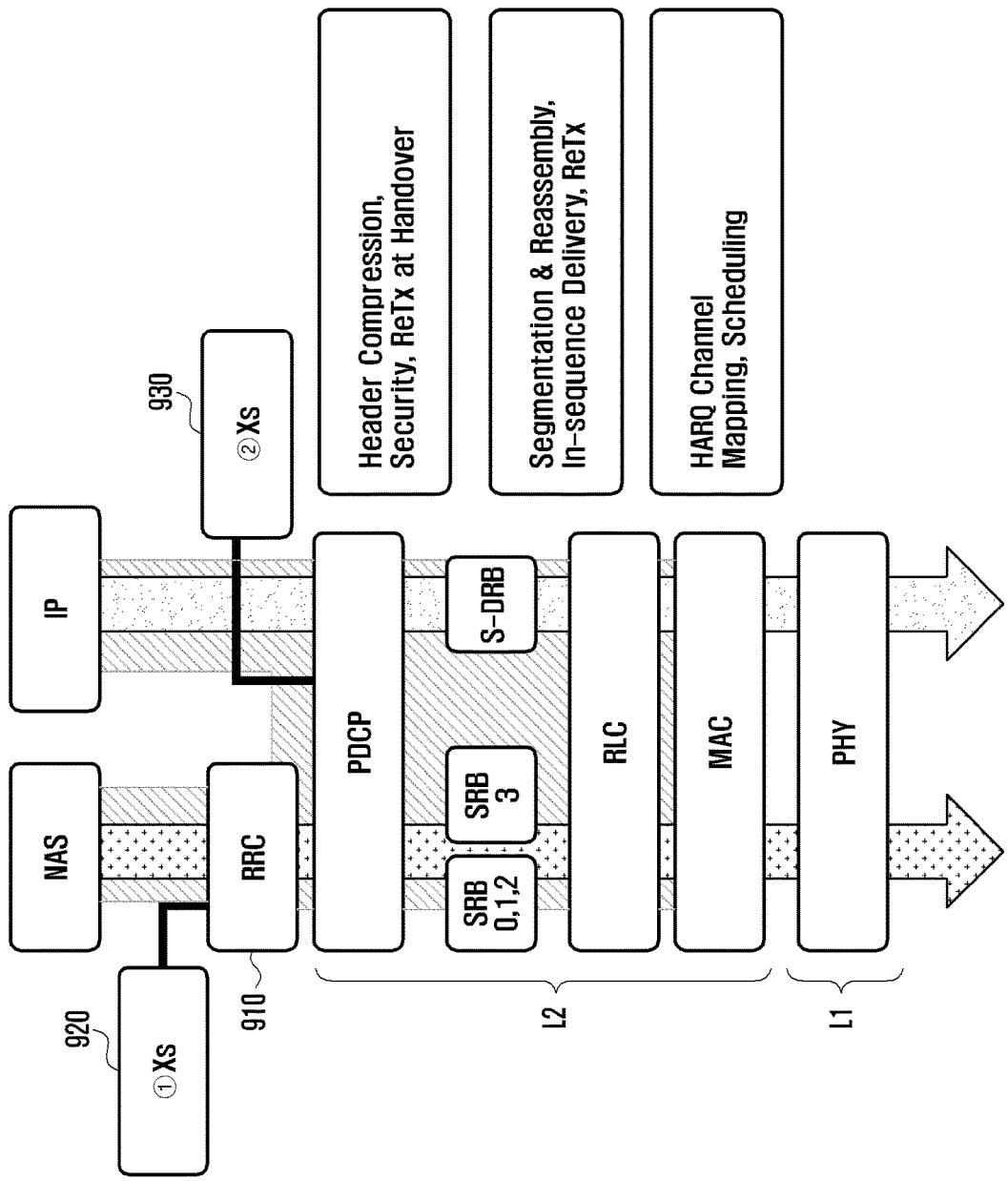
FIG. 9 is a diagram of a protocol stack for a dedicated logical bearer according to various embodiments of the present disclosure.

FIG. 9 is a diagram of a protocol stack for a dedicated logical bearer according to various embodiments of the present disclosure.

Referring to FIG. 9, a new layer Xs 920 or 930 may be introduced to the UE inside the mmW AP (i.e., UE@AP). A new bearer information is related to a mapping relationship between the UE ID and the mmW AP's identification (ID). That is, a mapping relationship between the UE@AP's ID and the mmW AP's ID is required.

The new layer Xs may be proposed as two types. A new layer Xs 920 may be located above the RRC layer 910. In this case, RRC messages may be used. For example, an RRC message as indicated by reference number 925 may be used. Referring to the reference number 925, Xs layer-related information may be encapsulated into an existing RRC message and then transmitted. For example, the Xs header and Xs payload may be added to the lower part of the RRC header and then transmitted. The second new layer Xs 930 may be located above the PDCP layer. In this case, a new Xs header as indicated by the reference number 935 may be used.

The embodiment of the present disclosure may set up a new bearer for transmitting a control plane between a macro cell eNB and an mmW AR In general, a signaling radio bearer (SRB) refers to a bearer for transmission of control signals and a data radio bearer (DRB) refers to a bearer for transmission of data. For example, common control signals (common control channel (CCCH)/broadcast control channel (BCCH)) may be transmitted via SRB 0, dedicated control signaling (DTCH) may be transmitted via SRB 1, and multimedia broadcast and multicast service (MBMS) channel signaling (MCCH) may be transmitted via SRB 2. Meanwhile, although signals transmitted between the eNB and the mmW AP are control signals, data may be transmitted from the viewpoint of the UE@AP in the mmW AR Therefore, there is a need to define which bearer will be used. That is, a determination (a definition) is made whether to use an SRB of the related art, to define a new SRB, or to use a DRB.

For example, a new SRB, SRB n, may be defined. SRB n may be SRB 3. The newly defined, SRB n may be a dedicated SRB for control signals between the eNB and the mmW AP. Meanwhile, the UE@AP may recognize the control signals as data. Therefore, a dedicated logical bearer may also be used as DRB. The embodiment of the present disclosure may use a DRB for control signals between the eNB and the mmW AP. The newly defined DRB may be a special DRB (S-DRB). The integrity protection/verification process of the related art may be performed by only an SRB. However, since the embodiment of the present disclosure transmits control signals via an S-DRB, the S-DRB may perform integrity/verification process.

Figure 10A:
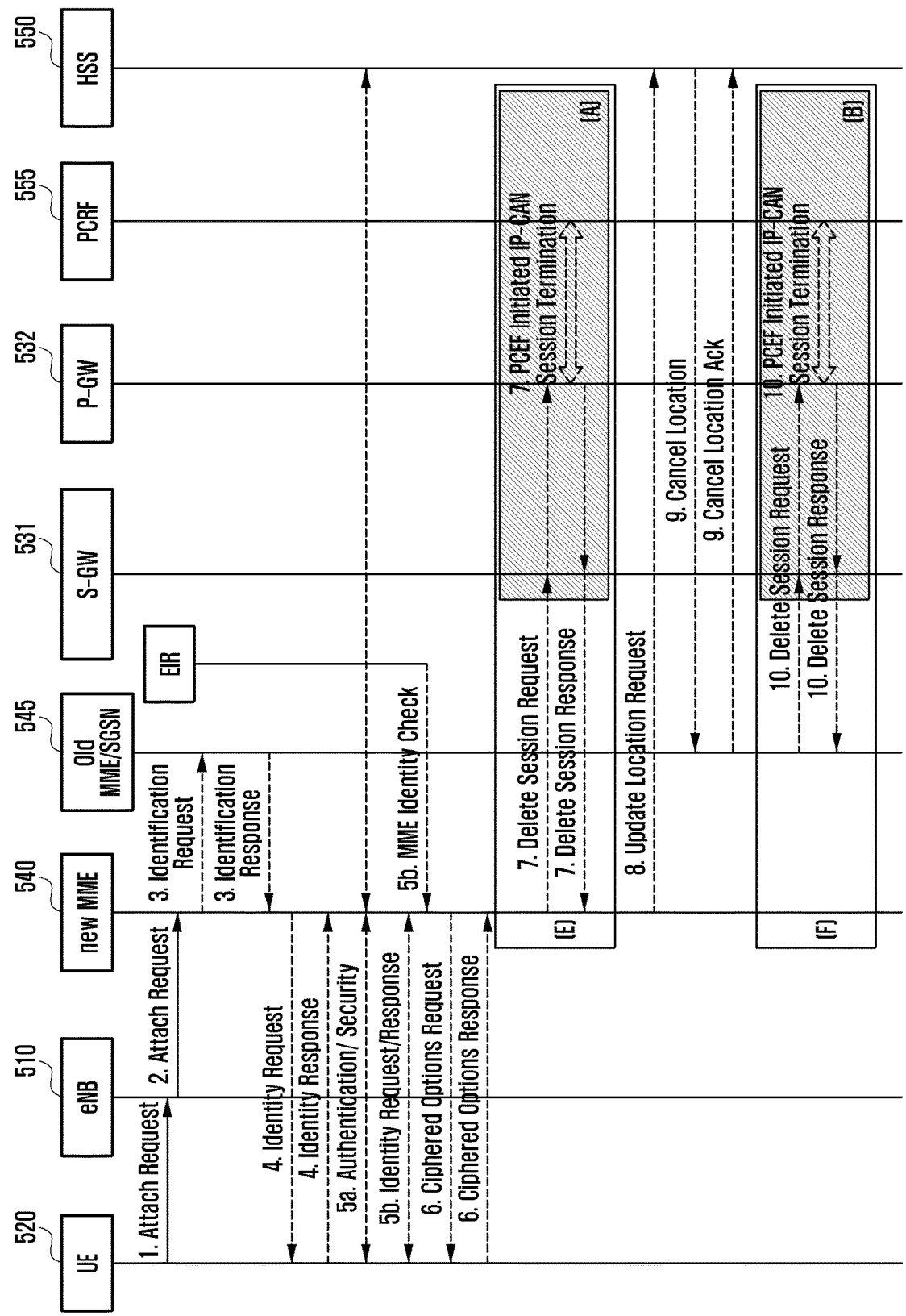
FIGS. 10A and 10B are flow diagrams of an initial setup procedure of LTE-user equipment (UE) in an mmW AP according to an embodiment of the present disclosure.
Figure 10B:
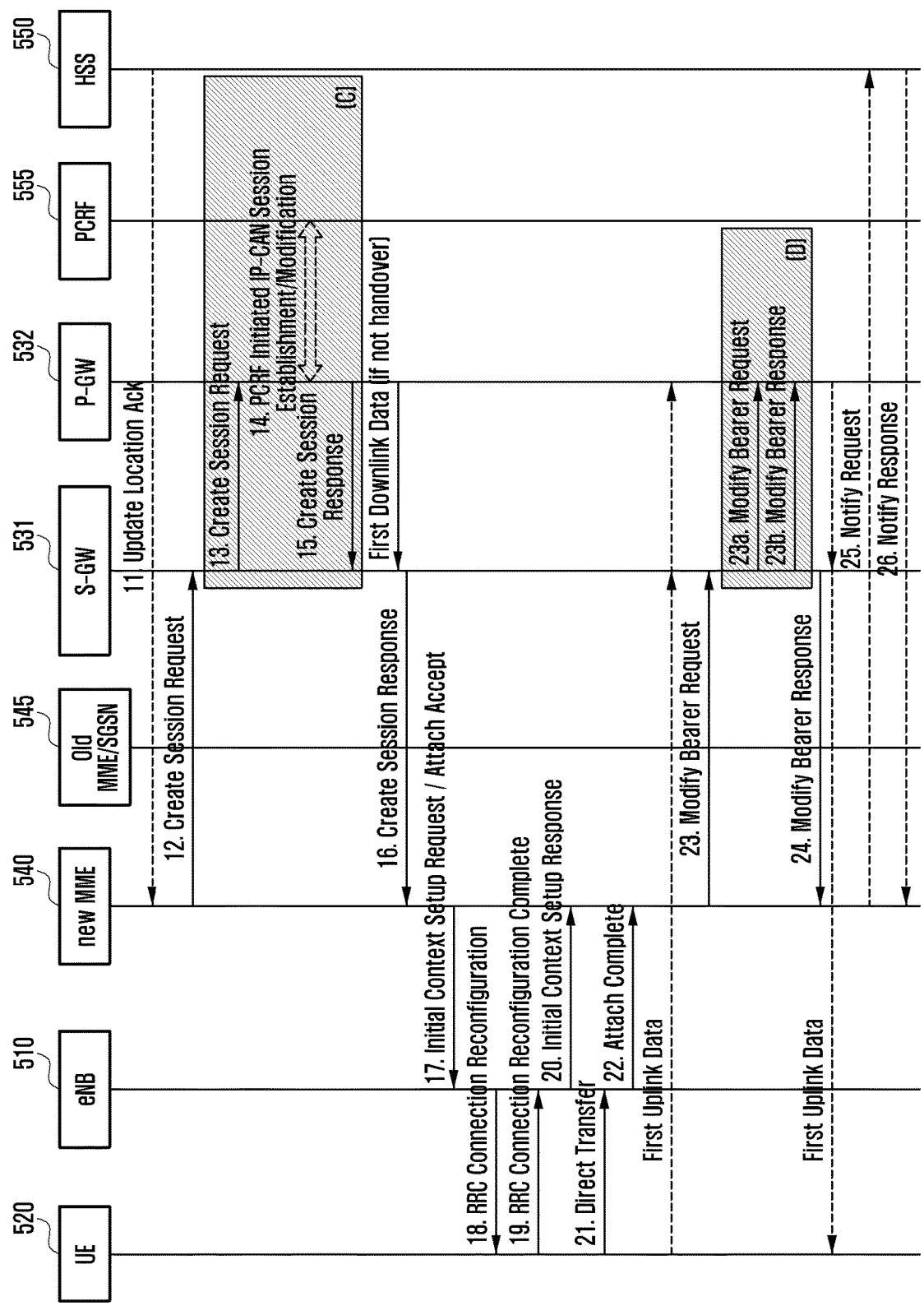

FIGS. 10A and 10B are diagrams of an initial setup procedure of LTE-UE in an mmW AP according to an embodiment of the present disclosure.

Referring to FIGS. 10A and 10B, the UE 520 refers to a UE included in the mmW AP.

1. The UE 520 transmits an attach request to the eNB 510, thereby starting the attach procedure.

2. The eNB 510 transmits the attach request to the new MME 540.

3. The new MME 540 transmits an identification request to the old MME 545, and the old MME 545 transmits the identification response to the new MME 540.

4. When the new MME 540 and old MME 545 do not have information about the UE 520, the new MME 540 transmits an identity request to the UE 520 and the UE 520 transmits the identity response to the new MME 540.

The embodiment of the present disclosure may use a new indicator for identifying the UE 520, e.g., the UE@AP indicator. UE capability information for the indicator may define capability information of the UE. The identity response transmitted from the UE may include the UE capability information. As another method, an RRC connection request may be transmitted, along with information indicating that the LTE-UE is included in the mmW AP.

5a. When the new MME 540 does not have the UE context, authentication and security processes may be performed between the new MME 540, the UE 520 and the HSS 550. The UE 520 may be authenticated via the authentication process. The HSS 550 may transmit subscription information to the new MME 540, based on the ID of the UE 520. The new MME 540 may authenticate the UE 520 included in the mmW AP, based on the received subscription information.

5b. The new MME 540 may check MME identity, and may transmit/receive an identity request/response to/from the UE 520.

6. The new MME 540 may transmit a ciphered options request to the UE 520, and the UE 520 may transmit the ciphered options response to the new MME 540.

7. The new MME 540 may transmit a delete session request via a S-GW 531 and a P-GW 532. The new MME 540 may receive the delete session response via the P-GW 532 and S-GW 531.

8. The new MME 540 may transmit an update location request to the HSS 550.

9. After receiving the update location request, the HSS 550 may transmit a cancel location message to the old MME 545, and receive the cancel location ACK from the old MME 545.

10. The new MME 540 may transmit a delete session request via the S-GW 531 and P-GW 532. The new MME 540 may receive the delete session response via the P-GW 532 and S-GW 531.

11. The HSS 550 may transmit the update location ACK to the new MME 540.

12. The new MME 540 may transmit a bearer setup message to the S-GW 531. The bearer setup message may be a create session request. The new MME 540 may request to set up, via the message, a dedicated bearer for transmitting control signals between the MeNB 510 using a cellular network and a UE included in the mmW AP. The dedicated bearer may be, for example, SRB 3 or S-DRB.

13. The S-GW 531 may transmit a create session request to the P-GW 532.

14. The P-GW 532 and a policy and charging rules function (PCRF) 555 may perform session establishment/modification.

15. The P-GW 532 may transmit a create session response to the S-GW 531.

16. The S-GW 531 may transmit a create session response to the new MME 540.

17. The new MME 540 may transmit an initial context setup request/attach accept.

18. The eNB 510 may transmit an RRC connection reconfiguration to the UE 520.

19. The UE 520 may transmit the RRC connection reconfiguration complete to the eNB 510.

20. The eNB 510 may transmit the initial context setup response to the new MME 540.

21. The UE 520 may transmit a direct transfer message to the eNB 510. The direct transfer message may include an attach complete message.

22. The eNB 510 may transmit the attach complete message to the new MME 540 based on the information received from the UE 520. After that, the UE 520 may transmit the first UL data.

23. The new MME 540 may transmit a modify bearer request to S-GW 531.

23a and 23b. The S-GW 531 may transmit a modify bearer request to the P-GW 532, and then the P-GW 532 may transmit the modify bearer response to S-GW 531.

24. The S-GW 531 may transmit the modify bearer response to the new MME 540. After that, the first DL data may be transmitted to the UE 520.

25. The new MME 540 may transmit a notify request to the HSS 550.

26. The HSS 550 may transmit the notify response to the new MME 540. Via the processes, the attach procedure of the LTE-UE included in the mmW AP may be completed.

Meanwhile, the general operations of FIG. 10 may refer to the attach procedure described in 3$^{rd}$ Generation Partnership Project (3GPP) technical specification (TS) 23.401 section 5.3.2.1.

Figure 11:
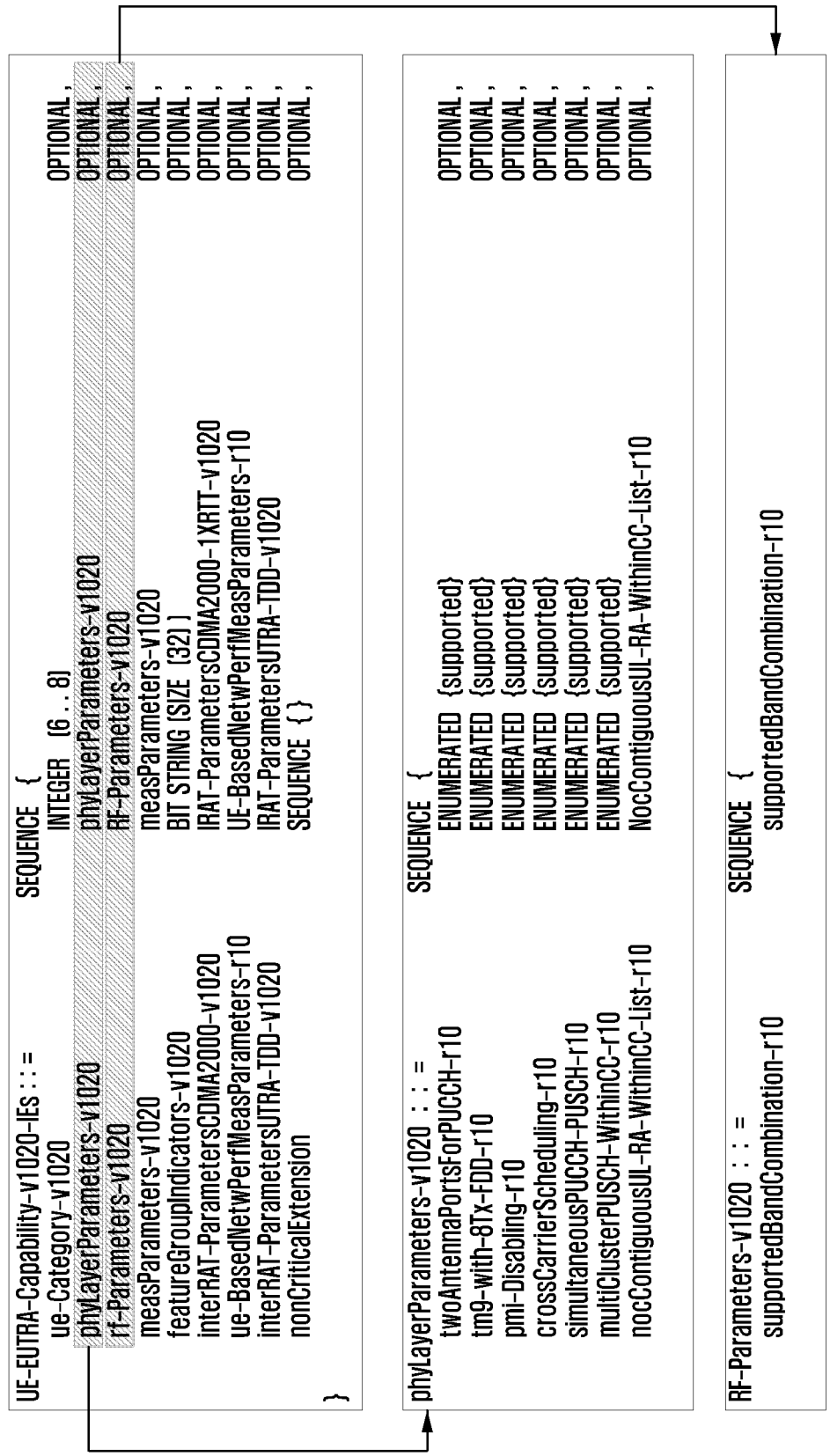
FIG. 11 is a diagram of UE capability information according to an embodiment of the present disclosure.

FIG. 11 is a diagram of UE capability information according to an embodiment of the present disclosure.

Referring to FIG. 11, definitions of UE capability information about the current LTE-UE are illustrated. In the embodiment of the present disclosure, the UE included in the mmW AP differs from a UE of the related art. The UE in the mmW AP receives control signals from a MeNB of a cellular network, via the cellular network. Therefore, the UE in the mmW AP needs to be distinguished from a legacy UE. To this end, the standard UE capability information field may define new capability for the UE included in the mmW AP.

For example, a capability of a UE included in the mmW AP may be defined in PHY layer parameters phyLayerParameters, and supported band combination supportedBandCombination may be defined in radio frequency (RF)-parameters.

The UE capability information may be transmitted in response to the UE capability inquiry message received from the upper network node.

Figure 12:
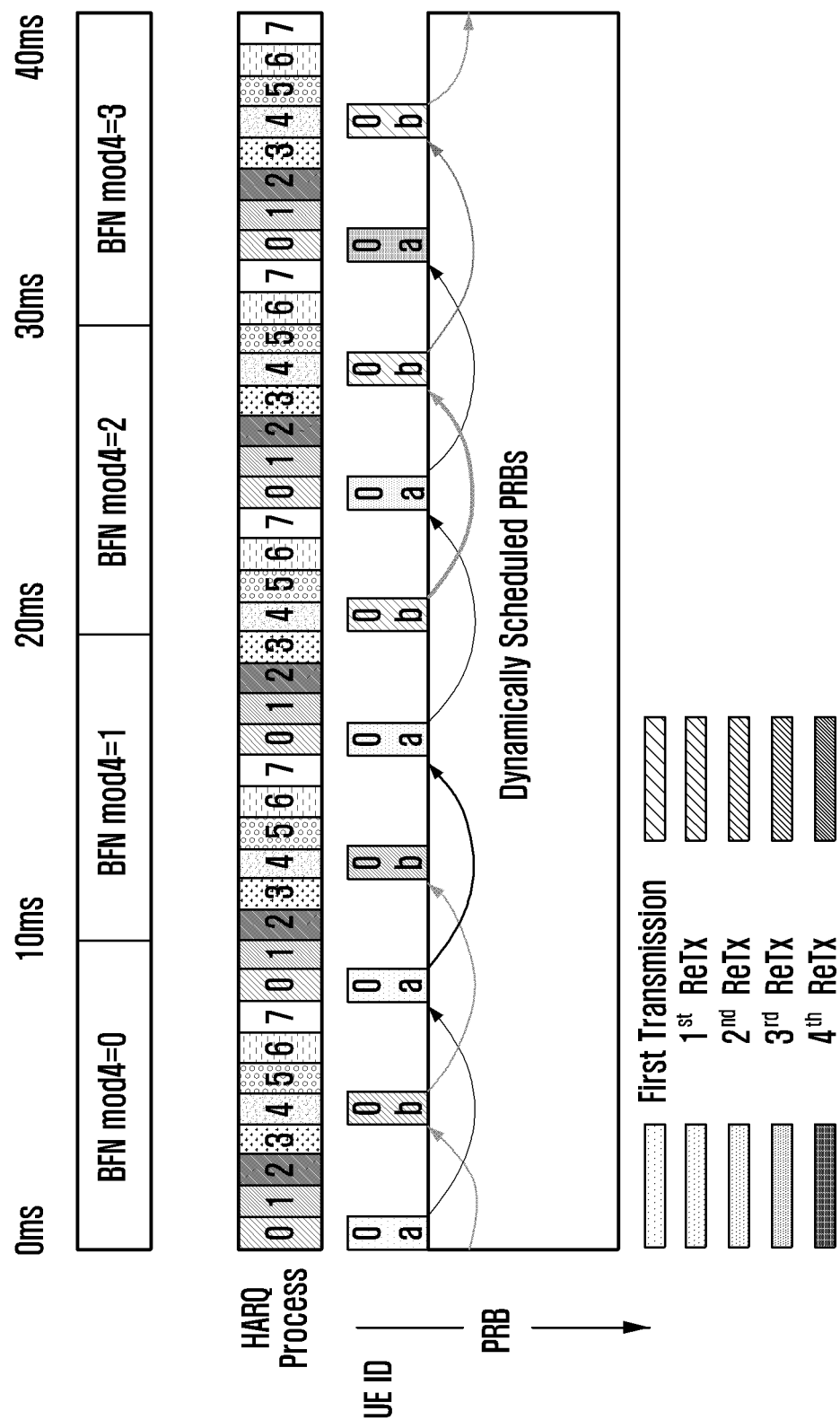
FIG. 12 is a diagram of semi-persistent scheduling (SPS) resource allocation according to various embodiments of the present disclosure.
Figure 13:
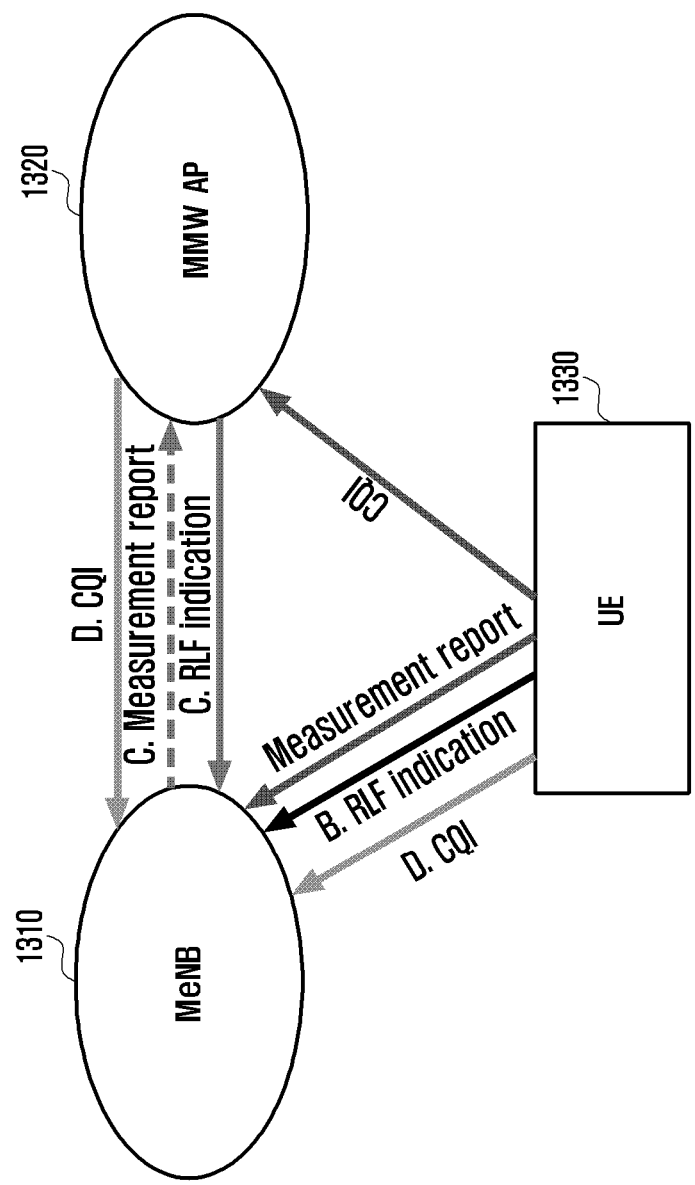
FIG. 13 is a diagram of signaling between a macro cell eNB, a small cell eNB, and a UE according to various embodiments of the present disclosure.

FIG. 12 is a diagram of semi-persistent scheduling (SPS) resource allocation according to various embodiments of the present disclosure, and FIG. 13 is a diagram of signaling between a macro cell eNB, a small cell eNB, and a UE according to various embodiments of the present disclosure.

Referring to FIGS. 12 and 13, the following description provides LTE SPS for control channel transmission in a multi-RAT system and the method of making the LTE SPS efficient.

In the LTE, both of the DL and UL are completely scheduled because the DL and UL traffic channels are dynamically shared. Therefore, to indicate which user decodes a physical DL shared channel (PDSCH) on respective subframes and which user is allowed to transmit a physical UL shared channel (PUSCH) via respective subframes, a physical DL control channel (PDCCH) needs to provide scheduling information.

PDCCH is used to transmit scheduling information, or DL control information (DCI), from a base station (i.e., an eNB in the LTE system) to an individual UE. In the related art, one PDCCH message includes one DCI format. Additional details about the DCI format are described in the 3GPP TS36.212 "Evolved Universal Terrestrial Radio Access (E-UTRA): Multiplexing and channel coding." Since a plurality of UE devices may be scheduled in the same subframe, the related art transmits a plurality of DCI messages via a plurality of PDCCHs.

The DCI is set to be transmitted to one individual UE device. However, some messages are broadcast (i.e., set to be transmitted to a plurality of UE devices in a cell). PDCCH may include information set to be transmitted to a group of UEs, e.g., a transmit power control (TPC) instruction (command). PDCCH may be used to form (configure) an SPS, and, in this case, the same resource may be periodically used.

SPS schedules resources for a UE on an ongoing basis, thereby reducing control channel overhead for application required for permanent wireless resource allocation, such as VoIP, etc. In LTE, since DL and UL are completely scheduled, when no SPS exists, allocation of all DL or UL physical resource blocks (PRBs) must be permitted via PDCCH messages. Therefore, for an application required for permanent allocation of a small amount of packets, the control channel overhead due to the scheduling information may be significantly reduced by SPS. In SPS, eNB defines permanent resource allocation that the user may estimate over DL or transmit over UL.

In LTE, a control channel message (using PDCCH) may be transmitted from one or more service providing cells to a UE. This control channel is usually used to inform the UE of information related to DL transmission that will be performed via the PDSCH or to allow for resources for transmission via the PUSCH. In addition, the PDCCH may be used to configure SPS, and, in this case, the same resources may be periodically used. The PDCCH may include information set to be transmitted to a group of UEs.

More specifically, Formats 3 and 3A transmit a plurality of TPC bits, each of which is related to a particular UE device. In general, in order to perform a scheduling process except for the SPS, each UE device needs an individual PDCCH.

SPS functions so that resource allocation can be previously configured. However, altering in resource allocation (including timing) of SPS for one UE device needs a PDCCH message for the UE. The current control channel configuration intended to perform the SPS has a plurality of restrictions.

In particular, the availability of resources for SPS is restricted to a particular limited set of periodicity, the number of resource element (RE) for SPS is fixed, the data rate (size of transmission block) for SPS is fixed, and the modulation and encoding modes for SPS are fixed.

As such, SPS may not meet any one of the UE-related PDCCH DCI formats to allow SPS to control channel transmission between a corresponding mmW small cell eNB and a macro cell eNB via LTE in a multi-RAT network.

Regular transmission of small packets of variable size (e.g., VoIP that has one of a set of packets that are small in size), intermittent or irregular transmission of small packets of the same size (e.g., sensor application for transmitting a measurement when temperature varies and regular transmission of small packets (e.g., VoIP) of the same size (in this case, wireless channel variation means that efficient channel adaptation needs variation of location of resource allocation in data rate and/or frequency domain), are supportable by SPS (in this case, a desired HARQ operation point causes a large probability in re-transmission and each re-transmission needs PDCCH message).

As shown in FIG. 13, since an LTE-UE included in the mmW AP 1320 transmits signaling, which is required for supporting the mobility of a plurality of UE devices 1330, to the cellular MeNB 1310, the priority of a corresponding LTE interface is higher than that of an existing LTE-UE.

The amount of data and the transmission frequency of control signals to support handover varies according to the inclination of the mobility of a UE associated with a corresponding mmW AP 1320. This is determined according to statistical characteristics of a UE connected to the mmW AP 1320. For example, when control information about an mmW AP 1320 installed inside a building or a shopping mall is transmitted or when control signals from an mmW AP 1320 installed by the roadside in a city are transmitted to support the mobility of corresponding UE devices 1330, the numbers (frequencies) of transmission may differ from each other. The present disclosure provides a method of selecting and operating an LTE mode for transmitting control signals between a cellular macro cell 1310 and mmW AP small cell 1320, via SPS and a DCI-based scheduling by PUCCH, based on the characteristics of control signals of UE devices 1330 from mmW APs 1320. Therefore, the present disclosure provides an efficient control channel function with low overhead by extending the SPS function. That is, the embodiment of the present disclosure may select a DCI-based scheduling or an SPS-based scheduling according to the states of the control channel. When an SPS-based scheduling is performed, the duty cycle and the period of SPS may be adjusted according to traffic of a control channel.

The mmW AP 1320 may feed the MeNB 1310 with information, such as the number of UE devices 1330 associated with the mmW AP 1320, the transmission frequency of required control signals based on the movement characteristics of a UE, etc.

The cellular macro cell 1310 may adjust the duty cycle and the period of SPS for UL/DL resources to the mmW AP 1320.

In an embodiment of the present disclosure, the mmW AP 1320 may feed the cellular macro cell 1310 with only the information, such as the transmission frequency of control signals and the cellular macro cell 1310 may independently adjust the duty cycle and the period of SPS based on its resource allocation state.

In an embodiment of the present disclosure, when the mmW AP 1320 explicitly makes a request of the duty cycle and the period of SPS, based on information such as the frequency of transmission of control signals, etc., it may adjust the duty cycle and the period of SPS when the MeNB 1310 accept or rejects the request according to its resource allocation state.

The period of SPS between the MeNB 1310 and the mmW AP 1320 exists. The duty cycle of SPS may be determined by the MeNB 1310 and the mmW AP 1320 based on the amount of control information (data).

In addition, the LTE-UE included in the mmW AP 1320 has the low mobility. In most cases, the LTE-UE may be in a still state. Therefore, the standard of the cell boundary according to the movement of a UE does not need a conservative configuration. Accordingly, TPC may be set up based on the measurement information about the LTE-UE included in the mmW AP 1320. In setting up TPC according to channel quality indicator (CQI), the margin may be set low.

In the following description, a method of setting RRC messages for an LTE-UE of the mmW AP according to various embodiments of the present disclosure is explained.

The LTE-UE module included in the mmW AP (hereinafter called LTE-UE@mmW_AP) for control channel transmission to an MeNB differs from an existing LTE-UE. Since a small cell eNB related to the LTE-UE@mmW_AP is likely to be fixed, the need of mobility management for the LTE interface is low. In addition, the mmW AP operates based on the connection to an electrical wire, so that the need of power saving-related operation is low. On the other hand, since the LTE-UE@mmW_AP performs transmission of signaling required for supporting the mobility of a plurality of UE devices associated with the mmW AP between the macro cell and the mmW AP small cell, a corresponding LTE interface link is higher in priority than the existing LTE-UE. Therefore, when a cellular macro cell performs resource allocation, it may allocate resources to the LTE-UE@mmW_AP prior to the existing LTE-UE or may setup for delay reduction.

For example, the resource allocation and setup may be performed as follows. For the measurement configuration of dedicated reference signal (DRS) that belonged to detailed RRC parameters, a cell list corresponding to DRS configuration and channel state information reference signal (CSI-RS) parameters may be set to meet the characteristics of the LTE-UE@mmW_AP.

In addition, the CSI-RS setup for DRS timing (DMTC) includes period and offset and reporting configuration. The CRS or existing/new events triggering may be differentiated. In addition, the priority may be set to be high, as compared with the existing LTE-UE. That is, the logical channel prioritization (LCP) may be set to be high. In addition, since the issue to reduce power consumption is relatively low, the period of discontinuous reception (DRX) may also be short.

Although the LTE-UE@mmW_AP performs data transmission at rates of Gigabits per second for a plurality of users, it is just one of the UE devices connected to an eNB, from the viewpoint of the MeNB.

Unlike traffic loading of a legacy UE, control signaling between the LTE-UE@mmW_AP and MeNB is performed such that, via information such as the frequency of transmission of control signals based on the mobility characteristics of a UE and the number of UE devices as the LTE-UE@mmW_AP associates with the mmW AP eNB, etc., the mmW AP eNB transmits control signals to the MeNB, and the setup of DRX and DRS (the period and the duty cycle) of the LTE-UE@mmW_AP is performed based on the transmission of control signals.

Figure 14:
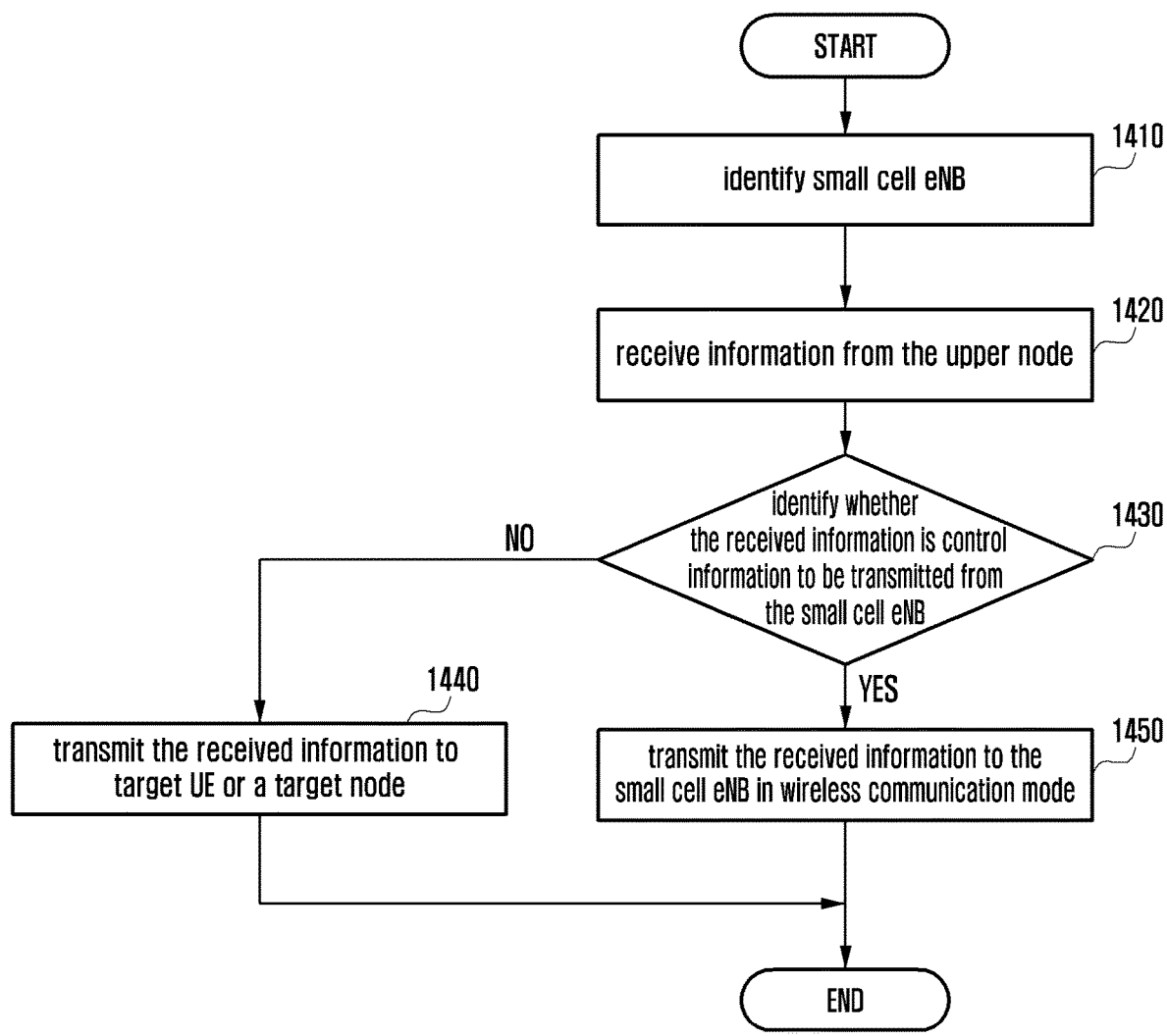
FIG. 14 is a flow diagram of a method of operating an eNB according to an embodiment of the present disclosure.

FIG. 14 is a flow diagram of a method of operating an eNB according to an embodiment of the present disclosure.

Referring to FIG. 14, the MeNB may identify small cell eNBs in operation 1410. The MeNB may identify whether the small cell is an mmW AP eNB. The MeNB may identify whether the mmW AP eNB is an eNB including an LTE-UE. To perform the identification process, a new identifier may be used. The identification may be performed according to the attach procedure of the LTE-UE included in the mmW AP eNB. UE capability information may define the LTE-UE included in the mmW AP (i.e., LTE-UE@mmW_AP).

The LTE-UE@mmW_AP may be identified by using the identity request and the identity response described above. The LTE-UE@mmW_AP may also be identified by identifying the capability information by using the UE capability enquiry message and the UE capability information message.

The MeNB may receive information from the upper node in operation 1420. The received information may be information that the MeNB needs to transmit to a target UE or a target node. The received information may also be information that the MeNB transmits to the LTE-UE@mmW_AP.

The MeNB may identify the received information in operation 1430. The MeNB may identify whether the received information is control information to be transmitted to the LTE-UE@mmW_AP. The MeNB may identify whether the received information is control information transmitted from the small cell eNB. When the MeNB ascertains that the received information is control information to be transmitted to the mmW_AP in operation 1430, it proceeds to operation 1450. On the other hand, when the received information is not control information to be transmitted to the mmW_AP in operation 1430, it proceeds to operation 1440.

The MeNB may transmit the received information to a target UE or a target node in operation 1440. The received information is transmitted in the same procedure as the eNB of the related art does.

The MeNB may transmit the received information to the small cell eNB in operation 1450. The received information may include control information corresponding to data that the small cell transmits to a target UE. The MeNB may transmit the received information in wireless communication mode. That is, the MeNB transmits the received information to the small cell eNB in a wireless communication mode. The wireless communication mode may be a first communication mode supported by the MeNB. The first communication mode may be an LTE communication mode. Since the embodiment of the present disclosure performs transmission of the received information via a wireless backhaul using mobile communication, it may reduce the transmission delay of control information.

In order to transmit control signals using wireless communication between the MeNB and the small cell eNB, the methods described above may be used. That is, the transmission of control signals may include separating an eNB backhaul from an unlicensed band small cell and managing the backhaul, setting up a new interface between an MeNB and an mmW AP, implementing an architecture of a new protocol stack (Xs) included in an unlicensed band AP, creating a dedicated logical bearer for an LTE-UE included in an unlicensed band AP, indicating a UE mode by a small cell eNB, implementing a scheduling method of a multi-RAT system, and differentiating the configuration of LTE-UE in an mmW AP by using an RRC message.

Figure 15:
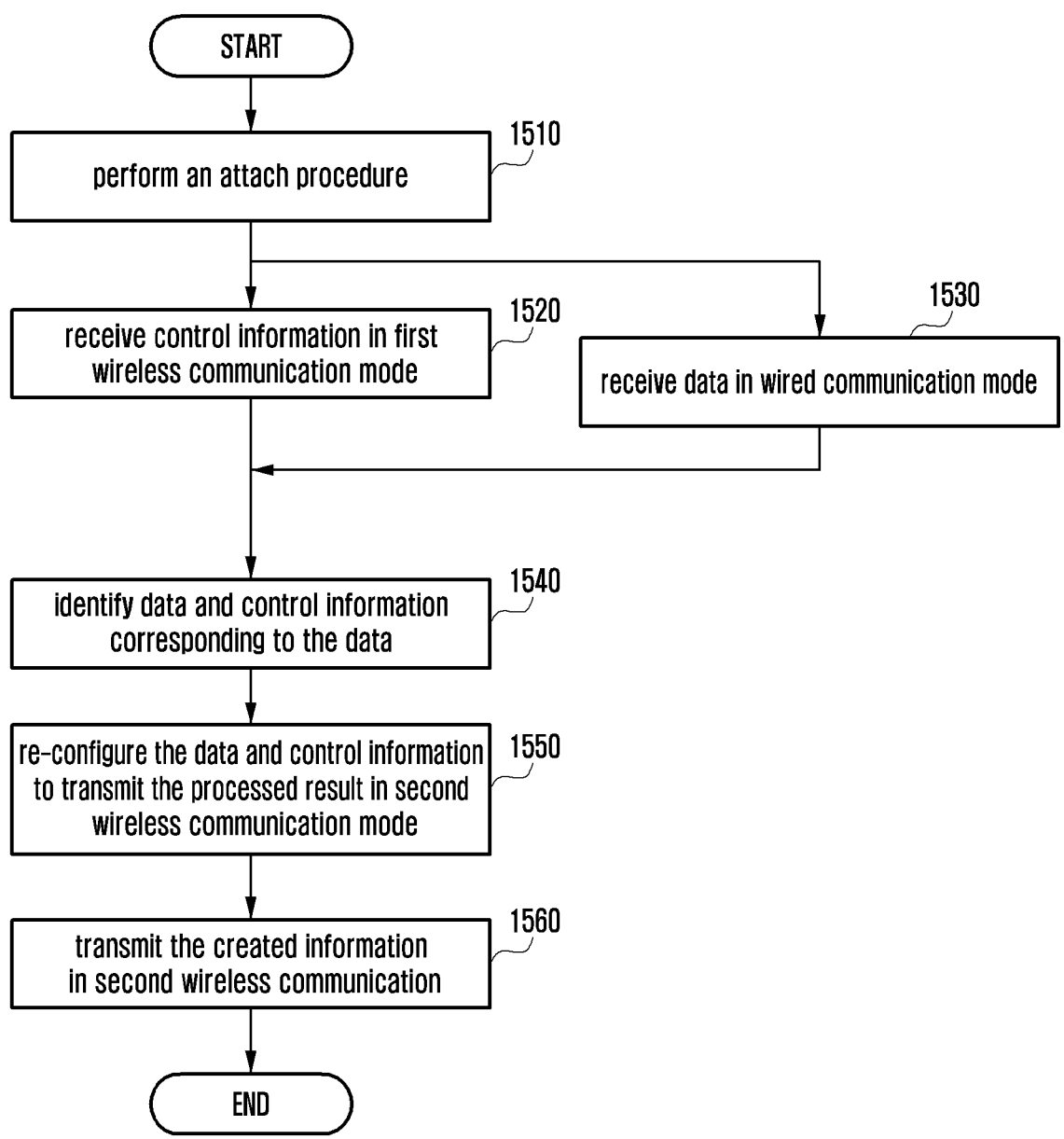
FIG. 15 is a flow diagram of a method of operating an mmW AP eNB according to an embodiment of the present disclosure.

FIG. 15 is a flow diagram of a method of operating an mmW AP eNB according to an embodiment of the present disclosure.

Referring to FIG. 15, the mmW AP may be a small cell eNB, an unlicensed band small cell eNB or an unlicensed band mmW AP. The mmW AP eNB may perform an attach procedure in operation 1510. The attach procedure refers to the description of FIG. 10. In this case, the LTE-UE of the mmW AP eNB may be identified. To perform the identification process, a new identifier may be used. The identification may be performed according to the attach procedure of the LTE-UE included in the mmW AP eNB. As described above with reference to FIGS. 10 and 11, UE capability information may define LTE-UE included in the mmW AP (i.e., LTE-UE@mmW_AP).

The mmW AP eNB receives control information in a first wireless communication mode in operation 1520. The received information may be control information for data that the mmW AP eNB will transmit to a target UE. The control information may be received from the MeNB. The mmW AP eNB may receive the control information in a wireless communication mode. The mmW AP eNB may receive the control information in mobile communication mode supported by the MeNB that performs transmission of the control information, e.g., an LTE communication mode.

The mmW AP eNB also receives data in operation 1530 via a backhaul which differs from a backhaul transmitting the control information. The data may be received in a wired communication mode. The data may be received by using a mobile communication mode which differs from the first communication mode or the Internet connected to the mmW AP eNB.

In operations 1520 and 1530, the received control signals are transmitted by the mmW AP and data signals corresponding to the control signals via respective backhauls which differ from each other. In particular, control signals are received from the MeNB by using a first wireless communication, and data is received in wired mode via the other backhaul or in a mode which differs from the first wireless communication mode.

The mmW AP eNB may identify data and control information corresponding to the received data in operation 1540. The mmW AP eNB may also identify data corresponding to the received control information. That is, since the mmW AP eNB receives control information and data via different backhauls, it may need to identify data corresponding to control information received via backhauls which differ from each other.

The mmW AP eNB may re-configure or create the received data and control information to transmit the processed result in a second wireless communication mode in operation 1550. The re-configuration means to process control signals, which are received in the first wireless communication mode, and data, which are received via a mode which differs from the first wireless communication mode or a wireless network, to transmit the processed result in a second wireless communication mode.

The mmW AP eNB may transmit the created information to a target node in the second wireless communication mode in operation 1560. The target node may be UE. The second wireless communication mode may differ from the first wireless communication mode.

In order to transmit and receive control signals using wireless communication between the mmW AP eNB and the MeNB, the methods described above with reference to FIGS. 4 to 13 may be used. That is, the transmission and reception of control signals may include separating an eNB backhaul from an unlicensed band small cell and managing the backhaul, setting up a new interface between an MeNB and an mmW AP, implementing an architecture of a new protocol stack (Xs) included in an unlicensed band AP, creating a dedicated logical bearer for an LTE-UE included in an unlicensed band AP, indicating a UE mode by a small cell eNB, implementing a scheduling method of a multi-RAT system, and differentiating the configuration of an LTE-UE in an mmW AP by using an RRC message.

Figure 16:
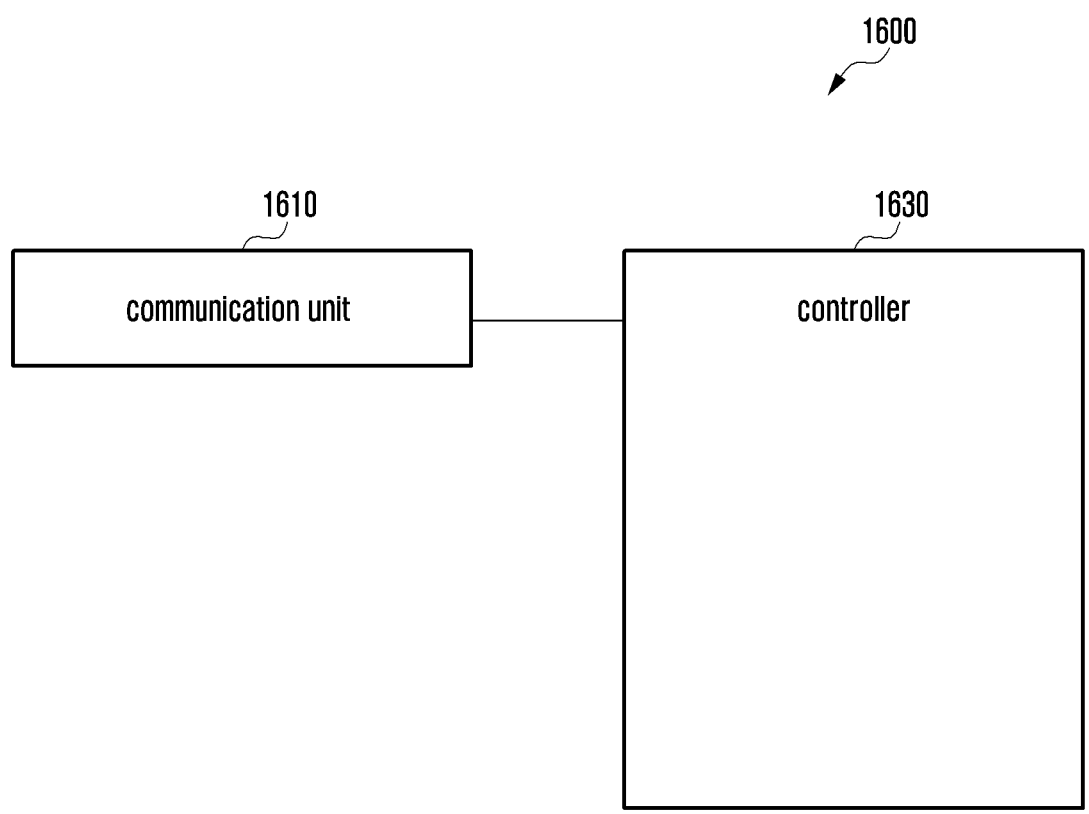
FIG. 16 is a block diagram of an eNB according to an embodiment of the present disclosure.

FIG. 16 is a block diagram of an eNB according to an embodiment of the present disclosure.

Referring to FIG. 16, the MeNB 1600 may include a communication unit 1610 and a controller 1630. The MeNB 1600 may receive/transmit signals from/to other nodes via the communication unit 1610. The controller 1630 may control the entire operation of the MeNB 1600.

The controller 1630 may receive first information, identify whether the first information is a control signal to be transmitted from a second eNB, and transmit, when the first information is a control signal to the second eNB, the first information to the second eNB in the first wireless communication mode. The first information may be a control signal corresponding to second information that the second eNB receives in a mode which differs from the first wireless communication mode. In addition, the first wireless communication may be LTE communication, and the second wireless communication may be unlicensed band mmW communication. In addition, the first information may be transmitted by using a mobile communication technology that the eNB provides to the serving UE. The second information may be transmitted to the Internet or a service provider's core network via a wired interface connected to the second eNB or in a communication mode which differs from the first wireless communication mode.

In the embodiment of the present disclosure, the controller 1630 may perform control operations to transmit first information in IP packets via the first wireless communication. In addition, the controller 1630 may set up a new logical bearer for receiving the first information between the first eNB and the second eNB. In that case, the logical bearer may include SRB 3 or S-DRB. The second eNB may include an LTE-UE for receiving the first information via the first wireless communication. The LTE-UE may include a new protocol stack (Xs) above the RRC or PDCP layer. In addition, the first information may include an Xs header and an Xs payload below the RRC header of the RRC message.

In addition, in the embodiment of the present disclosure, the second eNB may include a communication module for supporting a first wireless communication to receive the first information via the first wireless communication. The controller 1630 may perform control operations to identify whether the communication module for supporting the first wireless communication is a UE included in the second eNB. The controller 1630 may transmit a UE capability inquiry message to the first eNB and receive the UE capability response message from the first eNB. The UE capability response message may include identification information indicating whether the communication module supporting the first wireless communication is a UE included in the second eNB. In addition, the controller 1630 may perform control operations to identify whether the communication module is a UE included in the second eNB, based on UE subscription information stored in an HSS.

In the embodiment of the present disclosure, the first information may be transmitted via SPS, and a TPC may be determined based on the LTE-UE included in the second eNB. In addition, the duty cycle and the transmission period of SPS may be determined based on the control traffic of the LTE-UE included in the second eNB.

Although the embodiment of the present disclosure has described the components of the first eNB (e.g., MeNB) 1600 separately, it should be understood that the description does not limit the configuration of the first eNB 1600. It should also be understood that the first eNB may also perform the embodiments of the present disclosure described above.

Figure 17:
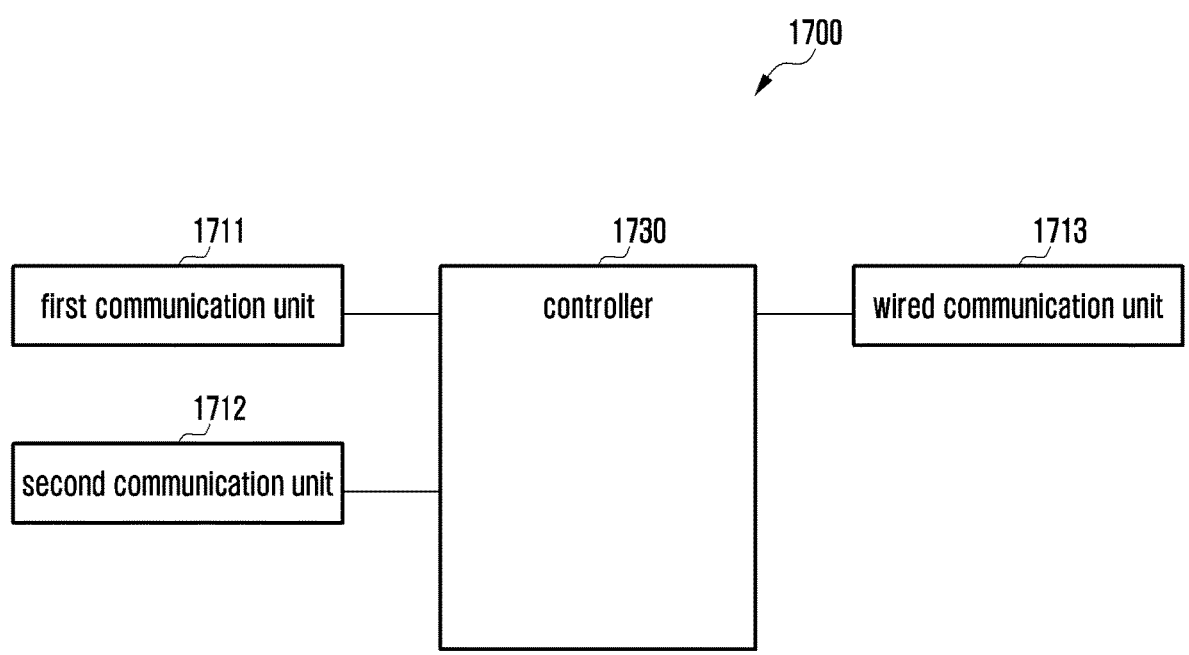
FIG. 17 is a block diagram of an mmW AP eNB according to an embodiment of the present disclosure.

FIG. 17 is a block diagram of an mmW AP eNB according to an embodiment of the present disclosure.

Referring to FIG. 17, the mmW AP eNB 1700 may include a first communication unit 1711, a second communication unit 1712, a wired communication unit 1713, and a controller 1730. The first communication unit 1711 may support a first wireless communication and perform transmission/reception of signals via the first wireless communication. The second communication unit 1712 may support a second wireless communication and perform transmission/reception of signals via the second wireless communication. The first communication unit 1711 may include an LTE-UE. In addition, the embodiment of the present disclosure may be modified to include a communication unit with the first communication unit 1711 and second communication unit 1712. The controller 1730 may control the entire operation of the second eNB 1700. The first information may be received by using a mobile communication technology that the first eNB provides information to a serving UE of the first eNB. The second information may be received from the Internet or a service provider's core network via a wired interface connected to the second eNB or in a communication mode which differs from the first wireless communication mode.

According to the embodiment of the present disclosure, the controller 1730 may receive first information from the first eNB via a first wireless communication, receive second information via a communication mode which differs from that of the first wireless communication, identify control information to be transmitted via a second wireless communication based on the first information, and data to be transmitted via the second wireless communication based on the second information, and transmit signals of the identified control information and identified data via second wireless communication. The first wireless communication may be an LTE communication, and the second wireless communication may be an unlicensed band millimeter wave communication.

The second eNB 1700 may include a communication module for supporting the first wireless communication to receive the first information via the first wireless communication. The controller 1730 may control the communication module.

The controller 1730 may perform control operations to receive first information in the format of IP packets via the first wireless communication.

In addition, the controller 1730 may perform control operations to set up a new logical bearer for receiving the first information between the first eNB and the second eNB. In that case, the logical bearer may include SRB 3 or S-DRB. The second eNB may include an LTE-UE for receiving the first information via the first wireless communication. The LTE-UE may include a new protocol stack (Xs) above the RRC or PDCP layer. In addition, the first information may include an Xs header and an Xs payload below the RRC header of the RRC message.

In addition, the controller 1730 may identify whether the communication module for supporting the first wireless communication included in the second eNB. The controller 1730 may receive a UE capability inquiry message from the first eNB and transmit the UE capability response message to the first eNB. The UE capability response message may include identification information indicating whether the communication module for supporting the first wireless communication is included in the second eNB. The controller 1630 may whether the communication module is included in the second eNB based on UE subscription information stored in an HSS.

In addition, the controller 1630 may identify whether the communication module is included in the second eNB based on UE subscription information stored in an HSS.

In the embodiment of the present disclosure, the first information may be transmitted via SPS, and a TPC may be determined based on the LTE-UE included in the second eNB. In addition, the duty cycle and the transmission period of SPS may be determined based on the control traffic of the LTE-UE included in the second eNB.

Although the embodiment of the present disclosure has described the components of the second eNB 1700 separately, it should be understood that the description does not limit the configuration of the second eNB 1700. It should also be understood that the second eNB may also perform the embodiments of the present disclosure described above with reference to FIGS. 1 to 13.

As described above, embodiments of the present disclosure can provide an efficient multi-RAT network.

In addition, embodiments of the present disclosure can provide a new backhaul design in connections (i.e., Xw interfaces) between a multi-RAT eNB and a small cell eNB (e.g., a MeNB and mmW eNB, inter-small cell eNB, etc.).

Various embodiments of the present disclosure can reduce installation and maintenance costs by separating backhauls, and can increase the system efficiency by reducing the transmission delay of control information.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A communication method of a second base station in a network using first wireless communication and second wireless communication, the communication method comprising:
receiving, by the second base station, first information including control information from a first base station via a first wireless communication link;
receiving, by the second base station, second information including data from a core network node;
identifying, by the second base station, the control information to be transmitted via a second wireless communication link from the first information;
identifying, by the second base station, the data to be transmitted via the second wireless communication link from the second information; and
transmitting, by the second base station, the control information and the data via the second wireless communication link,
wherein a user equipment (UE) included in the second base station includes a layer for receiving the control information,
wherein the layer is above a radio resource control (RRC) layer of the UE in case that a dedicated signaling bearer for the control information is established between a packet data convergence protocol (PDCP) layer and a radio link control (RLC) layer,
wherein the first information comprises an Xs header and Xs payload, and
wherein the Xs header and the Xs payload are included in an RRC header of an RRC message.

2. The method of claim 1, wherein the first information is received by using a mobile communication technology used by the first base station to communicate with a terminal served by the first base station.

3. The method of claim 1, wherein the first wireless communication link comprises a long term evolution (LTE) communication link, and wherein the second wireless communication link comprises a wireless communication link using a mmWave.

4. The method of claim 1, wherein the second base station comprises a transceiver to receive the first information via the first wireless communication link.

5. The method of claim 1, wherein the reception of the first information comprises:
receiving the first information in internet protocol (IP) packets via the first wireless communication link.

6. The method of claim 1, wherein the layer is above the PDCP layer in case that a special-data radio bearer (S-DRB) for receiving the first information is established between the PDCP layer and the RLC layer.

7. The method of claim 4, further comprising:
receiving a UE capability inquiry message from the first base station; and
transmitting a UE capability response message to the first base station,
wherein the UE capability response message comprises identification information indicating whether the transceiver is the UE included in the second base station.

8. The method of claim 4, further comprising:
identifying whether the transceiver is the UE included in the second base station based on whether UE subscription information exists in a home subscriber server (HSS).

9. The method of claim 1, wherein the first information is transmitted via a semi persistent scheduling (SPS) mode, and a transmit power control (TPC) is determined based on the UE included in the second base station, and wherein a duty cycle and a transmission period of the SPS is determined based on an amount of traffic of control channel of the UE.

10. A second base station of a network using first wireless communication link and second wireless communication link, the second base station comprising:
a first transceiver;
a second transceiver; and
a controller configured to:

receive first information including control information from a first base station via a first wireless communication link,
receive second information including data from a core network node,
identify control information to be transmitted via a second wireless communication link from the first information,
identify data to be transmitted via the second wireless communication link from the second information, and
transmit the control information and the data via the second wireless communication link,
wherein a user equipment (UE) included in the second base station includes a layer for receiving the control information,
wherein the layer is above a radio resource control (RRC) layer of the UE in case that a dedicated signaling bearer for the control information is established between a packet data convergence protocol (PDCP) layer and a radio link control (RLC) layer,
wherein the first information comprises an Xs header and Xs payload, and
wherein the Xs header and the Xs payload are included in an RRC header of an RRC message.

11. The second base station of claim 10,
wherein the first information is received by using a mobile communication technology used by the first base station to communicate with a terminal served by the first base station.

12. The second base station of claim 10,
wherein the first wireless communication link comprises a long term evolution (LTE) communication link, and
wherein the second wireless communication link comprises a wireless communication link using a mmWave.

13. The second base station of claim 10,
wherein the controller is further configured to identify whether the first transceiver is the UE included in the second base station.

14. The second base station of claim 10, wherein the first information is received in internet protocol (IP) packets via the first wireless communication link.

15. The second base station of claim 10, wherein the layer is above the PDCP layer in case that a special-data radio bearer (S-DRB) for receiving the first information is established between the PDCP layer and the RLC layer.

16. The second base station of claim 13,
wherein the controller is further configured to:
receive a UE capability inquiry message from the first base station, and
transmit a UE capability response message to the first base station, and
wherein the UE capability response message comprises identification information indicating whether the first transceiver is the UE included in the second base station.

17. The second base station of claim 13, wherein the controller is further configured to identify whether the first transceiver is the UE included in the second base station based on whether UE subscription information exists in a home subscriber server (HSS).

18. The second base station of claim 10,
wherein the first information is transmitted via a semi persistent scheduling (SPS) mode, and a transmit power control (TPC) is determined based on the UE included in the second base station, and
wherein a duty cycle and a transmission period of the SPS is determined based on an amount of traffic of control channel of the UE.

19. A communication method of a first base station in a network using first wireless communication link and second wireless communication link, the communication method comprising:
receiving, by the first base station, first information from a core network;
identifying, by the first base station, whether the first information received from the core network is control information to be transmitted from a second base station; and
when the first information is identified as the control information to be transmitted from the second base station, transmitting, by the first base station, the first information to the second base station via the first wireless communication link,
wherein second information including data is received by the second base station via a communication link which differs from the first wireless communication link,
wherein a user equipment (UE) included in the second base station includes a layer for receiving the control information,
wherein the layer is above a radio resource control (RRC) layer of the UE in case that a dedicated signaling bearer for the control information is established between a packet data convergence protocol (PDCP) layer and a radio link control (RLC) layer,
wherein the first information comprises an Xs header and Xs payload, and
wherein the Xs header and the Xs payload are included in an RRC header of an RRC message.

20. A first base station of a network using first wireless communication link and second wireless communication link, the first base station comprising:
a transceiver; and
a controller configured to:
receive first information from a core network,
identify whether the first information received from the core network is control information to be transmitted from a second base station, and
when the first information is identified as the control information to be transmitted from the second base station, control the transceiver to transmit the first information to the second base station via the first wireless communication link,
wherein second information including data is received by the second base station via a communication link which differs from the first wireless communication link,
wherein a user equipment (UE) included in the second base station includes a layer for receiving the control information,
wherein the layer is above a radio resource control (RRC) layer of the UE in case that a dedicated signaling bearer for the control information is established between a packet data convergence protocol (PDCP) layer and a radio link control (RLC) layer,
wherein the first information comprises an Xs header and Xs payload, and
wherein the Xs header and the Xs payload are included in an RRC header of an RRC message.

* * * * *